(12) United States Patent
Kim et al.

(10) Patent No.: US 12,529,560 B2
(45) Date of Patent: Jan. 20, 2026

(54) ELECTRONIC DEVICE AND OPERATION METHOD THEREOF

(71) Applicant: SAMSUNG ELECTRONICS CO., LTD., Suwon-si (KR)

(72) Inventors: Jinik Kim, Suwon-si (KR); Namjoon Park, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 595 days.

(21) Appl. No.: 17/903,039

(22) Filed: Sep. 6, 2022

(65) Prior Publication Data

US 2023/0049947 A1    Feb. 16, 2023

Related U.S. Application Data

(63) Continuation of application No. PCT/KR2022/011650, filed on Aug. 5, 2022.

(30) Foreign Application Priority Data

Aug. 10, 2021    (KR) .................... 10-2021-0105106

(51) Int. Cl.
*G01C 17/38*    (2006.01)
*G01C 17/02*    (2006.01)
(Continued)

(52) U.S. Cl.
CPC ............. *G01C 17/38* (2013.01); *G01C 17/02* (2013.01); *G06F 3/013* (2013.01); *G06F 3/0346* (2013.01); *G06F 3/14* (2013.01)

(58) Field of Classification Search
CPC ............. G06F 3/147; G09G 2354/00; G09G 2370/022; G09G 2380/06; G04G 9/0064; G04G 99/006
See application file for complete search history.

(56) References Cited

U.S. PATENT DOCUMENTS 10,345,893 B2    7/2019    Lee et al.
2012/0075168 A1*  3/2012    Osterhout ............... G06F 3/017
                                                              345/8
(Continued)

FOREIGN PATENT DOCUMENTS

CN    112817424 A    5/2021
JP      5996645 B2    9/2016
(Continued)

OTHER PUBLICATIONS

The extended European search report for EP Application No. 22856115.5 mailed on Sep. 27, 2024.
(Continued)

*Primary Examiner* — Mi'Schita' Henson
(74) *Attorney, Agent, or Firm* — CANTOR COLBURN LLP

(57) ABSTRACT

An electronic device includes sensors, a display, and a processor electrically connected to the sensors and the display, in which the electronic device is in a first running mode for permanently providing compass information or a second running mode for providing the compass information, in response to a request from a user. When set to be in the first running mode, the processor a performance mode of a digital compass to be a first performance mode, determines first performance mode-based compass information using the sensors, and displays the determined first performance mode-based compass information on the display. When set to be in the second running mode, the processor sets the performance mode of the digital compass to be a second performance mode, determines second performance mode-based compass information using the sensors at the request from the user, and displays the determined second performance mode-based compass information on the display.

18 Claims, 10 Drawing Sheets

(51) Int. Cl.
  *G06F 3/01* (2006.01)
  *G06F 3/0346* (2013.01)
  *G06F 3/14* (2006.01)

(56) References Cited

U.S. PATENT DOCUMENTS

2013/0218515 A1 8/2013 Ashida
2017/0295325 A1* 10/2017 Yoon .................... H04N 5/265
2019/0072908 A1 3/2019 Katzer et al.
2019/0384392 A1* 12/2019 Aimone ............... G02B 27/017
2020/0408521 A1 12/2020 Lyons et al.
2021/0089734 A1 3/2021 Toumazou

FOREIGN PATENT DOCUMENTS

| KR | 10-2008-0059102 A | 6/2008 |
| KR | 10-2016-0000398 A | 1/2016 |
| KR | 10-2016-0028759 A | 3/2016 |
| KR | 10-1649191 B1 | 8/2016 |
| KR | 10-2017-0018958 A | 2/2017 |
| KR | 10-2017-0105827 A | 9/2017 |
| KR | 10-1872907 B1 | 6/2018 |
| KR | 10-1959609 B1 | 3/2019 |
| KR | 10-2019-0035214 A | 4/2019 |
| KR | 10-2058947 B1 | 12/2019 |
| KR | 10-2020-0014959 A | 2/2020 |

OTHER PUBLICATIONS

International Search Report mailed Nov. 14, 2022 for PCT/KR2022/011650. In conformance with MPEP 609—Concise explanation of the relevance includes issue date of foreign OA and references cited therein.
C. Culman et al: "Easing Power Consumption of Wearable Activity Monitoring with Change Point Detection", Sensors, Jan. 6, 2020, 21 pages, vol. 20, No. 1.
European Office Action for EP Application No. 22856115.5 mailed on Dec. 16, 2025.

* cited by examiner

ELECTRONIC DEVICE AND OPERATION METHOD THEREOF

CROSS-REFERENCE TO RELATED APPLICATIONS

This application is a PCT-Bypass application of an international application number PCT/KR2022/011650, filed on Aug. 5, 2022, which claims priority to a Korean patent application number 10-2021-0105106, filed on Aug. 10, 2021, and all the benefits accruing therefrom under 35 U.S.C. § 119, the content of which in its entirety is herein incorporated by reference.

BACKGROUND

1. Field

The disclosure relates to an electronic device and an operation method thereof.

2. Description of Related Art

The advancement in electronic technology has developed and spread various types of electronic products, among which a wearable electronic device that may be worn on a body has been widely used.

SUMMARY

An embodiment of the disclosure may provide an electronic device providing bearing angle information using a 9-axis sensor (e.g., an acceleration sensor, a gyro sensor, and a geomagnetic sensor). The electronic device may process data of all the 9-axis sensor at a fast sampling rate to provide accurate bearing angle information. For a small electronic device (e.g., a wearable electronic device), power optimization may be required to improve the time of usage.

An embodiment of the disclosure may provide an electronic device providing bearing information through variable operations of a sensor.

An embodiment of the disclosure may provide an electronic device that differently sets a running mode for providing compass information to reduce current consumption.

An embodiment of the disclosure may provide an electronic device that differently sets a performance mode of a digital compass based on a motion of a user to reduce current consumption.

However, technical aspects of the present disclosure are not limited to the foregoing aspects, and other technical aspects may also be present. Additional aspects of the disclosure will be set forth in part in the description which follows and, in part, will be apparent from the description, or may be learned by practice of the presented embodiments of the disclosure.

According to an embodiment, an electronic device includes a plurality of sensors, a display, and a processor electrically connected to the sensors and the display, where the electronic device is in a first running mode for permanently providing compass information or a second running mode for providing the compass information, in response to a request from a user. In such an embodiment, when the electronic device is set to be in the first running mode, the processor sets a performance mode of a digital compass to be a first performance mode, determines first performance mode-based compass information using the sensors, and displays the determined first performance mode-based compass information on the display. In such an embodiment, when the electronic device is set to be in the second running mode, the processor sets the performance mode of the digital compass to be a second performance mode, determines second performance mode-based compass information using the sensors at the request from the user, and displays the determined second performance mode-based compass information on the display.

According to an embodiment, an electronic device includes a plurality of sensors, a display, and a processor electrically connected to the sensors and the display. In such an embodiment, the processor displays, on the display, a display screen including a digital compass in a permanent running mode in which compass information is permanently provided, determines first performance mode-based compass information of the digital compass using the sensors, and provides the first performance mode-based compass information to a user through the digital compass. In such an embodiment, the processor changes a performance mode of the digital compass from a first performance mode to a second performance mode in response to an input to the digital compass on the display screen, determines second performance mode-based compass information using the sensors, and displays, on the display, a compass face including the second performance mode-based compass information.

According to an embodiment, an electronic device includes a plurality of sensors, a display, and a processor electrically connected to the sensors and the display. In such an embodiment, the processor determines first performance mode-based compass information of a digital compass using the sensors in a permanent running mode in which compass information is permanently provided, and displays the determined first performance mode-based compass information on the display. In such an embodiment, the processor determines whether a first motion of a user occurs, determine whether the user gazes at the display when it is determined that the first motion occurs, changes a performance mode of the digital compass from a first performance mode to a second performance mode when it is determined that the user gazes at the display, determines second performance mode-based compass information using the sensors, and displays the determined second performance mode-based compass information on the display.

According to another embodiment, a method of operating an electronic device includes: when the electronic device is set to be in a first running mode, setting a performance mode of a digital compass to be a first performance mode, where the electronic device is in the first running mode for permanently providing compass information or in a second running mode for providing the compass information, in response to a request from a user; determining first performance mode-based compass information using a plurality of sensors of the electronic device; displaying the determined first performance mode-based compass information on the display of the electronic device; when the electronic device is set to be in the second running mode, setting the performance mode of the digital compass to be a second performance mode; determining second performance mode-based compass information using the sensors at the request from the user; and displaying the determined second performance mode-based compass information on the display.

According to various example embodiments described herein, differently setting a running mode for providing compass information according to a user setting may reduce current consumption.

According to various example embodiments described herein, differently setting a method of displaying a user interface (UI) of a digital compass according to a state (e.g., a static state with no movement or a charging state) of an electronic device may improve the user experience of the digital compass.

Other features and aspects will be apparent from the following detailed description, the drawings, and the claims.

BRIEF DESCRIPTION OF THE DRAWINGS

The above and other features of certain embodiments of the present disclosure will be more apparent from the following detailed description, taken in conjunction with the accompanying drawings, in which.

DETAILED DESCRIPTION

Figure 1:
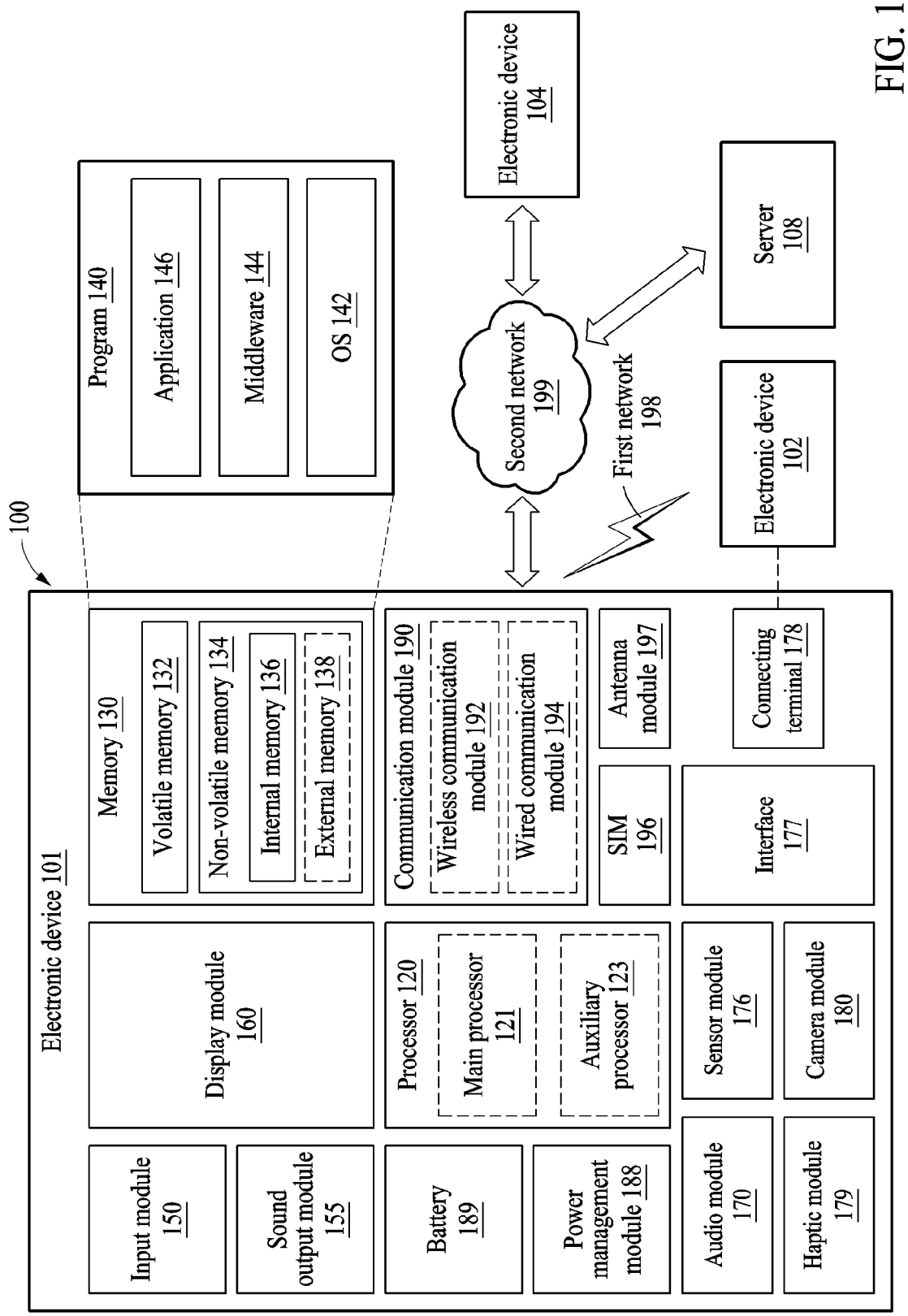
FIG. 1 is a block diagram illustrating an electronic device in a network environment according to an example embodiment.

Hereinafter, various example embodiments will be described in greater detail with reference to the accompanying drawings. When describing the example embodiments with reference to the accompanying drawings, like reference numerals refer to like elements and a repeated description related thereto will be omitted.

FIG. 1 is a block diagram illustrating an electronic device in a network environment, according to an embodiment. Referring to FIG. 1, in an embodiment, an electronic device 101 in a network environment 100 may communicate with an electronic device 102 via a first network 198 (e.g., a short-range wireless communication network), or communicate with at least one selected from an external electronic device 104 and a server 108 via a second network 199 (e.g., a long-range wireless communication network). The electronic device 101 may communicate with the external electronic device 104 via the server 108. The electronic device 101 includes a processor 120, a memory 130, an input module 150, a sound output module 155, a display module 160, an audio module 170, and a sensor module 176, an interface 177, a connecting terminal 178, a haptic module 179, a camera module 180, a power management module 188, a battery 189, a communication module 190, a subscriber identification module (SIM) 196, or an antenna module 197. At least one (e.g., the connecting terminal 178) selected from the above components may be omitted from the electronic device 101, or one or more other components may be added in the electronic device 101. Some of the components (e.g., the sensor module 176, the camera module 180, or the antenna module 197) may be integrated as a single component (e.g., the display module 160).

The processor 120 may execute, for example, software (e.g., a program 140) to control at least one other component (e.g., a hardware or software component) of the electronic device 101 connected to the processor 120, and may perform various data processing or computation. As at least a part of data processing or computation, the processor 120 may store a command or data received from another component (e.g., the sensor module 176 or the communication module 190) in a volatile memory 132, process the command or data stored in the volatile memory 132, and store resulting data in a non-volatile memory 134. The processor 120 includes a main processor 121 (e.g., a central processing unit (CPU) or an application processor (AP)) or an auxiliary processor 123 (e.g., a graphics processing unit (GPU), a neural processing unit (NPU), an image signal processor (ISP), a sensor hub processor, or a communication processor (CP)) that is operable independently of, or in conjunction with, the main processor 121. In an embodiment, for example, when the electronic device 101 includes the main processor 121 and the auxiliary processor 123, the auxiliary processor 123 may be adapted to consume less power than the main processor 121 or to be specific to a specified function. The auxiliary processor 123 may be implemented separately from the main processor 121 or as a part of the main processor 121.

The auxiliary processor 123 may control at least some of functions or states related to at least one (e.g., the display device 160, the sensor module 176, or the communication module 190) selected from the components of the electronic device 101, instead of the main processor 121 while the main processor 121 is in an inactive (e.g., sleep) state or along with the main processor 121 while the main processor 121 is an active state (e.g., executing an application). The auxiliary processor 123 (e.g., an ISP or a CP) may be implemented as a portion of another component (e.g., the camera module 180 or the communication module 190) that is functionally related to the auxiliary processor 123. The auxiliary processor 123 (e.g., an NPU) may include a hardware structure specified for artificial intelligence (AI) model processing. An AI model may be generated by machine learning. Such learning may be performed by, for example, the electronic device 101 in which the AI model is performed, or performed via a separate server (e.g., the server 108). Learning algorithms may include, but are not limited to, for example, supervised learning, unsupervised learning, semi-supervised learning, or reinforcement learning. The AI model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), and a bidirectional recurrent deep neural network (BRDNN), a deep Q-network, or a combination of two or more thereof, but is not limited thereto. The AI model may additionally or alternatively include a software structure other than the hardware structure.

The memory 130 may store various data used by at least one component (e.g., the processor 120 or the sensor module 176) of the electronic device 101. The data may include, for example, software (e.g., the program 140) and input data or output data for a command related thereto. The memory 130 includes the volatile memory 132 or the non-volatile memory 134. The non-volatile memory 134 includes an internal memory 136 and an external memory 138.

The program 140 may be stored as software in the memory 130, and includes, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output a sound signal to the outside of the electronic device 101. The sound output module 155 may include, for example, a speaker or a receiver. The speaker may be used for general purposes, such as playing multimedia or playing records. The receiver may be used to receive an incoming call. The receiver may be implemented separately from the speaker or as a part of the speaker.

The display module 160 may visually provide information to the outside (e.g., a user) of the electronic device 101. The display module 160 may include, for example, a display, a hologram device, or a projector, and a control circuitry to control a corresponding one of the display, the hologram device, and the projector. The display module 160 may include a touch sensor adapted to sense a touch, or a pressure sensor adapted to measure an intensity of a force incurred by the touch. The display module 160 may be implemented in a foldable structure and/or a rollable structure, for example. In this case, the size of a display screen of the display module 160 may decrease in a folded state and increase in an unfolded state.

The audio module 170 may convert a sound into an electric signal or vice versa. The audio module 170 may obtain the sound via the input module 150 or output the sound via the sound output module 155 or an external electronic device (e.g., the electronic device 102 such as a speaker or a headphone) directly or wirelessly connected to the electronic device 101.

The sensor module 176 may detect an operational state (e.g., power or temperature) of the electronic device 101 or an environmental state (e.g., a state of a user) external to the electronic device 101, and generate an electric signal or data value corresponding to the detected state. The sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with an external electronic device (e.g., the electronic device 102) directly (e.g., wiredly) or wirelessly. The interface 177 may include, for example, a high-definition multimedia interface (HDMI), a universal serial bus (USB) interface, a secure digital (SD) card interface, or an audio interface.

The connecting terminal 178 may include a connector via which the electronic device 101 may be physically connected to an external electronic device (e.g., the electronic device 102). The connecting terminal 178 may include, for example, an HDMI connector, a USB connector, an SD card connector, or an audio connector (e.g., a headphone connector).

The haptic module 179 may convert an electric signal into a mechanical stimulus (e.g., a vibration or a movement) or an electrical stimulus which may be recognized by a user via his or her tactile sensation or kinesthetic sensation. The haptic module 179 may include, for example, a motor, a piezoelectric element, or an electric stimulator.

The camera module 180 may capture a still image and moving images. The camera module 180 may include one or more lenses, image sensors, ISPs, or flashes.

The power management module 188 may manage power supplied to the electronic device 101. The power management module 188 may be implemented as, for example, at least a part of a power management integrated circuit (PMIC).

The battery 189 may supply power to at least one component of the electronic device 101. The battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and an external electronic device (e.g., the electronic device 102, the external electronic device 104, or the server 108) and performing communication via the established communication channel. The communication module 190 may include one or more communication processors that are operable independently of the processor 120 (e.g., an AP) and that support direct (e.g., wired) communication or wireless communication. The communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., a LAN or a wide area network (WAN)). These various types of communication modules may be implemented as a single component (e.g., a single chip), or may be implemented as multiple components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network after a 4G network, and a next-generation communication technology, e.g., a new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., a mmWave band) to achieve, e.g., a high data transmission rate. The wireless communication module 192 may support various technologies for securing performance on a high-frequency band, such as, e.g., beamforming, massive multiple-input and multiple-output (MIMO), full dimensional MIMO (FD-MIMO), an array antenna, analog beamforming, or a large scale antenna. The wireless communication module 192 may support various requirements specified in the electronic device 101, an external electronic device (e.g., the external electronic device 104), or a network system (e.g., the second network 199). The wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., an external electronic device) of the electronic device 101. The antenna module 197 may include an antenna including a radiating element including a conductive material or a conductive pattern formed in or on a substrate (e.g., a printed circuit board (PCB)). The antenna module 197 may include a plurality of antennas (e.g., array antennas). In such an embodiment, at least one antenna appropriate for a communication scheme used in a communication network, such as the first network 198 or the second network 199, may be selected by, for example, the communication module 190 from the plurality of antennas. The signal or the power may be transmitted or received between the communication module 190 and the external electronic device via the at least one selected antenna. Another component (e.g., a radio frequency integrated circuit (RFIC)) other than the radiating element may be additionally formed as or defined by a part of the antenna module 197.

The antenna module 197 may form a mmWave antenna module. The mmWave antenna module may include a PCB, an RFIC disposed on a first surface (e.g., a bottom surface) of the PCB or adjacent to the first surface and capable of supporting a designated high-frequency band (e.g., the mmWave band), and a plurality of antennas (e.g., array antennas) disposed on a second surface (e.g., a top or a side surface) of the PCB or adjacent to the second surface and capable of transmitting or receiving signals in the designated high-frequency band.

At least some of the above-described components may be coupled mutually and communicate signals (e.g., commands or data) therebetween via an inter-peripheral communication scheme (e.g., a bus, general-purpose input and output (GPIO), serial peripheral interface (SPI), or mobile industry processor interface (MIPI)).

Commands or data may be transmitted or received between the electronic device 101 and the external electronic device 104 via the server 108 coupled with the second network 199. Each of the external electronic devices 102 and 104 may be a device of the same type as or a different type from the electronic device 101. All or some of operations to be executed by the electronic device 101 may be executed at one or more of (or at least one selected from) the external electronic devices 102, 104, and 108. In an embodiment, for example, if the electronic device 101 is desired to perform a function or a service automatically, or in response to a request from a user or another device, the electronic device 101, instead of, or in addition to, executing the function or the service, may request one or more external electronic devices to perform at least a part of the function or the service. The one or more external electronic devices receiving the request may perform the at least part of the function or the service requested, or an additional function or an additional service related to the request, and may transfer an outcome of the performing to the electronic device 101. The electronic device 101 may provide the outcome, with or without further processing of the outcome, as at least a part of a reply to the request. To that end, a cloud computing, distributed computing, mobile edge computing (MEC), or client-server computing technology may be used, for example. The electronic device 101 may provide ultra-low latency services using, e.g., distributed computing or mobile edge computing. In an embodiment, for example, the external electronic device 104 may include an Internet-of-things (IoT) device. The server 108 may be an intelligent server using machine learning and/or a neural network. The external electronic device 104 or the server 108 may be included in the second network 199. The electronic device 101 may be applied to intelligent services (e.g., smart home, smart city, smart car, or healthcare) based on 5G communication technology or IoT-related technology.

Figure 2A:
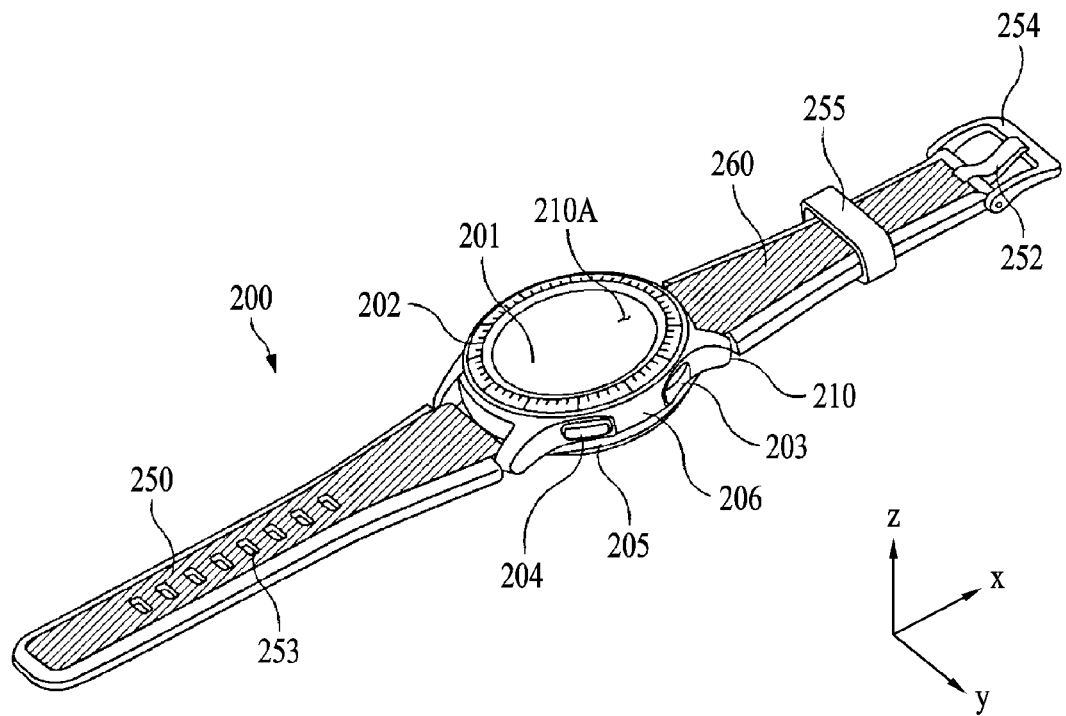
FIGS. 2A and 2B are perspective views of an electronic device according to an example embodiment.
Figure 2B:
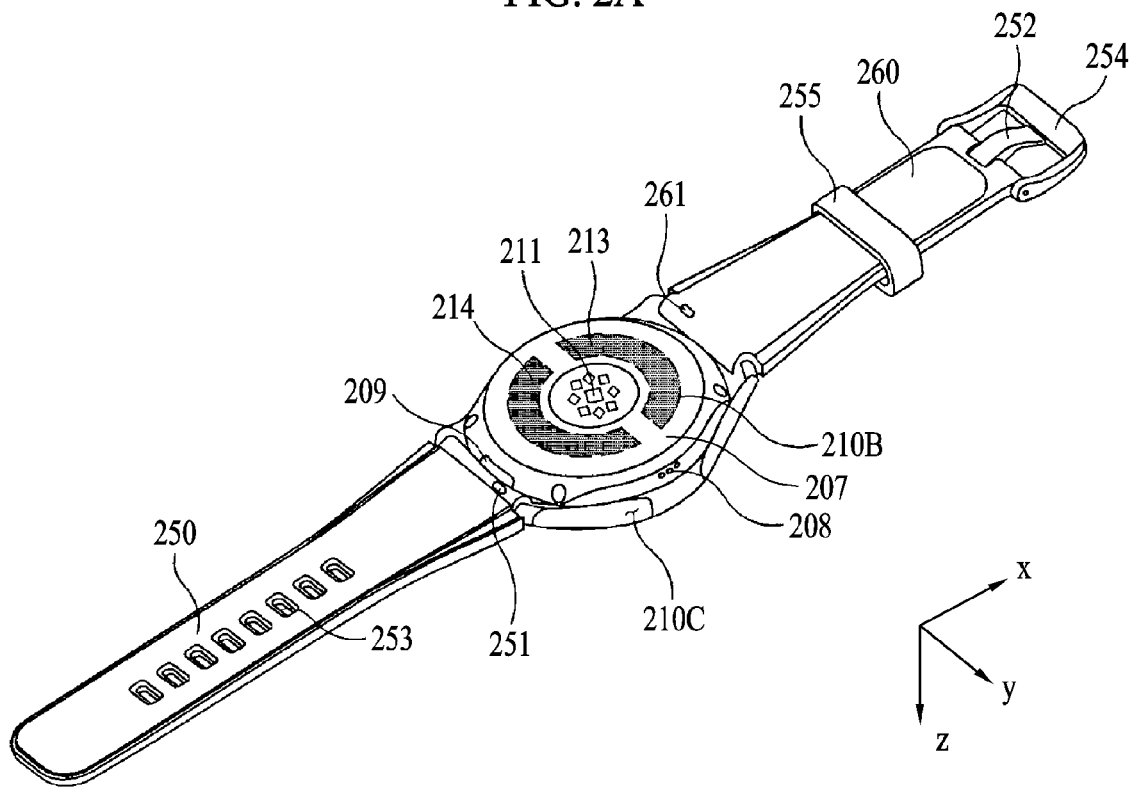

Referring to FIGS. 2A and 2B, according to an embodiment, an electronic device 200 (e.g., the electronic device 101 of FIG. 1) may include a housing 210 including a first surface (or a front surface) 210A, a second surface (or a back surface) 210B, and a side surface 210C surrounding a space between the first surface 210A and the second surface 210B, and fastening members 250 and 260 connected to at least a portion of the housing 210 and configured to detachably attach the electronic device 200 to a body part (e.g., a wrist, an ankle, etc.) of a user. According to an alternative embodiment (not shown), a housing may refer to a structure that forms a portion of the first surface 210A, the second surface 210B, and the side surface 210C illustrated in FIGS. 2A and 2B. According to an embodiment, the first surface 210A may be formed by a front plate 201 (e.g., a glass plate or a polymer plate including various coating layers) of which at least a portion is substantially transparent. The second surface 210B may be formed by a back plate 207 that is substantially opaque. The back plate 207 may include or be formed of, for example, coated or tinted glass, ceramic, polymer, metal (e.g., aluminum, stainless steel (STS), or magnesium), or a combination of at least two thereof. The side surface 210C may be coupled to the front plate 201 and the back plate 207 and may be formed by a side bezel structure (or a side member) 206 including metal and/or polymer. According to an alternative embodiment, the back plate 207 and the side bezel structure 206 may be integrally formed with each other as a single unitary indivisible part and may include a same material as each other (e.g., a metal material such as aluminum). The fastening members 250 and 260 may include or be formed of various materials and shapes. A woven fabric, leather, rubber, urethane, metal, ceramic, or a combination of at least two thereof may be used to form the fastening members 250 and 260 integrally with each other and to allow a plurality of unit links to flow with each other.

According to an embodiment, the electronic device 200 may include at least one selected from a display 220 (refer to FIG. 3), audio modules 205 and 208, a sensor module 211, key input devices 202, 203, and 204, and a connector hole 209. According to an alternative embodiment, the electronic device 200 may not include at least one selected from the foregoing components, for example, the key input devices 202, 203, and 204, the connector hole 209, or the sensor module 211, or additionally include another component.

The display 220 may be visually exposed through a substantial portion of the front plate 201, for example. The display 220 may be provided in a shape corresponding to a shape of the front plate 201, which may be various shapes such as a circle, an ellipse, or a polygon. The display 220 may be coupled to or disposed adjacent to a touch sensing circuit, a pressure sensor configured to measure the intensity (pressure) of a touch, and/or a fingerprint sensor.

The audio modules 205 and 208 may include a microphone hole 205 and a speaker hole 208. The microphone hole 205 may have therein a microphone for acquiring an external sound, and the microphone may be provided as a plurality of microphones to sense directions of a sound according to some embodiments. The speaker hole 208 may be used as an external speaker and a receiver for calls. According to an alternative embodiment, the speaker hole 208 and the microphone hole 205 may be implemented as a single hole, or a speaker (e.g., a piezo speaker) may be included without the speaker hole 208.

The sensor module 211 may generate an electrical signal or a data value corresponding to an internal operating state of the electronic device 200 or an external environmental state. The sensor module 211 may include, for example, a biosensor module (i.e., sensor module 211) (e.g., a heart rate monitor (HRM)) disposed on the second surface 210B of the housing 210. The electronic device 200 may further include a sensor module (not shown), for example, at least one selected from an optical sensor, a motion sensor (e.g., a gyro sensor, an acceleration sensor, a speed sensor, etc.), a gesture sensor, a barometric pressure sensor, a magnetic sensor, a grip sensor, a color sensor, an infrared (IR) sensor, a biosensor, a temperature sensor, a humidity sensor, and an illuminance sensor.

The sensor module 211 may include electrode areas 213 and 214 that form a portion of the surface of the electronic device 200 and a bio signal detection circuit (not shown) electrically connected to the electrode areas 213 and 214. In an embodiment, for example, the electrode areas 213 and 214 may include a first electrode area 213 and a second electrode area 214 disposed on the second surface 210B of the housing 210. The sensor module 211 may be configured such that the electrode areas 213 and 214 obtain an electrical signal from the body part of the user and the bio signal detection circuit detects biometric information of the user based on the electrical signal.

The key input devices 202, 203, and 204 may include a wheel key (i.e., key input device 202) disposed on the first surface 210A of the housing 210 and rotatable in at least one direction, and/or side key buttons (i.e., key input devices 203 and 204) disposed on the side surface 210C of the housing 210. The wheel key may be provided in a shape corresponding to the shape of the front plate 201. According to an alternative embodiment, the electronic device 200 may not include some or all of the key input devices 202, 203, and 204, and the key input devices 202, 203, and 204 that are not included may be implemented in other forms such as soft keys on the display 220. The connector hole 209 may include another connector hole (not shown) that accommodates a connector (e.g., a universal serial bus (USB) connector) for transmitting and receiving power and/or data to and from an external electronic device and accommodates a connector for transmitting and receiving an audio signal to and from an external electronic device. The electronic device 200 may further include, for example, a connector cover (not shown) that covers at least a portion of the connector hole 209 and prevents an inflow of foreign substances into the connector hole 209.

The fastening members 250 and 260 may be detachably attached to at least a portion of the housing 210 using locking members 251 and 261. The fastening members 250 and 260 may include one or more of a fixing member 252, a fixing member fastening hole 253, a band guide member 254, and a band fixing ring 255.

The fixing member 252 may be configured to fix the housing 210 and the fastening members 250 and 260 to the body part (e.g., a wrist, an ankle, etc.) of the user. The fixing member fastening hole 253 may correspond to the fixing member 252 to fix the housing 210 and the fastening members 250 and 260 to the body part of the user. The band guide member 254 may be configured to limit a range of a movement of the fixing member 252 when the fixing member 252 is fastened to the fixing member fastening hole 253, so that the fastening members 250 and 260 are closely attached to the body part of the user. The band fixing ring 255 may limit a range of a movement of the fastening members 250 and 260 while the fixing member 252 and the fixing member fastening hole 253 are fastened to each other.

Figure 3:
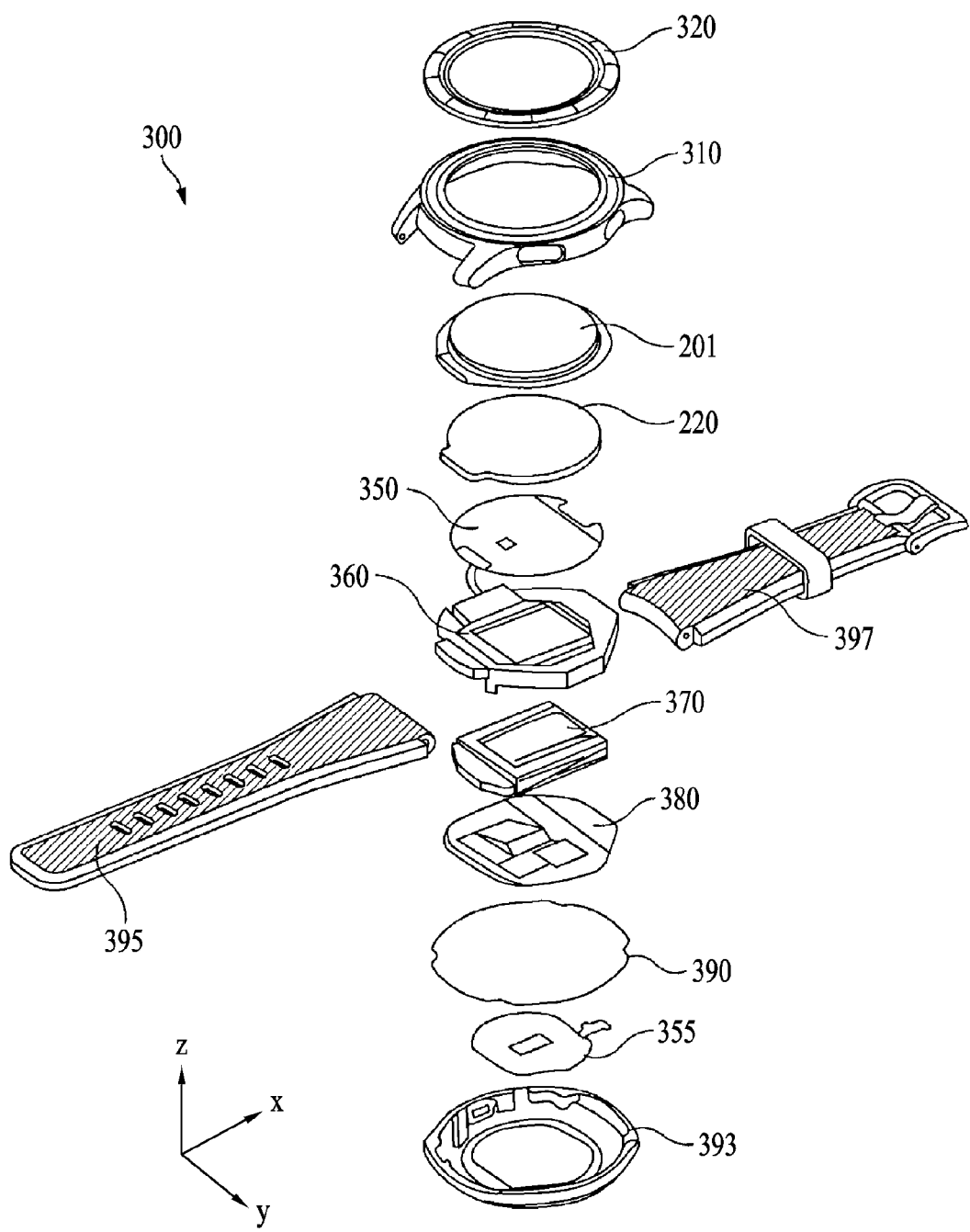
FIG. 3 is an exploded perspective view of an electronic device according to an example embodiment.

Referring to FIG. 3, an embodiment of an electronic device 300 (e.g., the electronic device 101 of FIG. 1 or the electronic device 200 of FIGS. 2A and 2B) may include a side bezel structure 310, a wheel key 320, a front plate 201, a display 220, a first antenna 350, a second antenna 355, a support member 360 (e.g., a bracket), a battery 370, a printed circuit board (PCB) 380, a sealing member 390, a back plate 393, and fastening members 395 and 397. At least one selected from the components of the electronic device 300 may be the same as or similar to corresponding components of the electronic device 101 of FIG. 1 or the electronic device 200 of FIGS. 2A and 2B, and thus any repetitive detailed description thereof will be omitted here for brevity. The support member 360 may be disposed inside the electronic device 300 and connected to the side bezel structure 310, or be integrally formed with the side bezel structure 310 as a single unitary indivisible part. The support member 360 may include or be formed of, for example, a metal material and/or a non-metal material (e.g., polymer). The display 220 may be connected to one surface of the support member 360, and the PCB 380 may be connected to the other surface of the support member 360. The PCB 380 may be provided with a processor, a memory, and/or an interface. The processor may include, for example, one or more of a central processing unit (CPU), a graphics processing unit (GPU), an application processor (AP), a sensor processor, or a communication processor.

The memory may include, for example, a volatile memory or a non-volatile memory. The interface may include, for example, a high-definition multimedia interface (HDMI), a USB interface, a secure digital (SD) card interface, and/or an audio interface. The interface may include, for example, a USB connector, an SD card/multimedia connect (MMC) connector, or an audio connector, to connect, electrically or physically, the electronic device 300 to an external electronic device.

The battery 370, which is a device for supplying power to at least one component of the electronic device 300, may include, for example, a non-rechargeable primary battery, a rechargeable secondary battery, or a fuel cell. In an embodiment, for example, at least a portion of the battery 370 may be disposed on substantially the same plane as the PCB 380. The battery 370 may be disposed integrally inside the electronic device 300, or disposed detachably from the electronic device 300.

The first antenna 350 may be disposed between the display 220 and the support member 360. The antenna 350 may include, for example, a near-field communication (NFC) antenna, a wireless charging antenna, and/or a magnetic secure transmission (MST) antenna. In an embodiment, for example, the first antenna 350 perform short-range communication with an external device, wirelessly transmit and receive power required for charging, or transmit a magnetism-based signal including a short-range communication signal or payment data. According to an alternative embodiment, an antenna structure may be formed or defined by a portion or combination of the side bezel structure 310 and/or the support member 360.

The second antenna 355 may be disposed between the PCB 380 and the back plate 393. The antenna 355 may include, for example, an NFC antenna, a wireless charging antenna, and/or an MST antenna. In an embodiment, for example, the second antenna 355 may perform short-range communication with an external device, wirelessly transmit and receive power required for charging, or transmit a magnetism-based signal including a short-range communication signal or payment data. According to an alternative embodiment, an antenna structure may be formed or defined by a portion or combination of the side bezel structure 310 and/or the back plate 393.

The sealing member 390 may be disposed between the side bezel structure 310 and the back plate 393. The sealing member 390 may be configured to prevent moisture and foreign substances from flowing into or entering a space surrounded by the side bezel structure 310 and the back plate 393 from the outside.

According to various example embodiments, the display 220 may correspond to an xy plane, and an up vector of the xy plane may correspond to a field of view (FOV) vector to be described later in the present disclosure.

According to various example embodiments, an electronic device may be a device of one of various types. The electronic device may include, as non-limiting examples, a portable communication device (e.g., a smartphone, etc.), a computing device, a portable multimedia device, a portable medical device, a camera, a wearable device, or a home appliance. However, the electronic device is not limited to the foregoing examples.

It should be appreciated that various example embodiments of the present disclosure and the terms used therein are not intended to limit the technological features set forth herein to particular example embodiments and include various changes, equivalents, or replacements for a corresponding example embodiment. In connection with the description of the drawings, like reference numerals may be used for similar or related components. It is to be understood that a singular form of a noun corresponding to an item may include one or more of the things, unless the relevant context clearly indicates otherwise. As used herein, "A or B," "at least one of A and B," "at least one of A or B,", "at least one selected from A and B", "A, B or C," "at least one of A, B and C," and "A, B, or C,", "at least one selected from A, B and C", each of which may include any one of the items listed together in the corresponding one of the phrases, or all possible combinations thereof. Terms such as "first," "second," or "first" or "second" may simply be used to distinguish the component from other components in question, and do not limit the components in other aspects (e.g., importance or order). It is to be understood that if an element (e.g., a first element) is referred to, with or without the term "operatively" or "communicatively," as "coupled with," "coupled to," "connected with," or "connected to" another element (e.g., a second element), it means that the element may be coupled with the other element directly (e.g., wiredly), wirelessly, or via a third element.

As used in connection with various example embodiments of the disclosure, the term "module" may include a unit implemented in hardware, software, or firmware, and may interchangeably be used with other terms, for example, "logic," "logic block," "part," or "circuitry." A module may be a single integral component, or a minimum unit or part thereof, adapted to perform one or more functions. For example, according to an example embodiment, the module may be implemented in the form of an application-specific integrated circuit (ASIC).

Various example embodiments set forth herein may be implemented as software (e.g., the program 140) including one or more instructions that are stored in a storage medium (e.g., the internal memory 136 or the external memory 138) that is readable by a machine (e.g., the electronic device 101). In an embodiment, for example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Here, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to various example embodiments, a method according to an example embodiment of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The terms "below" or "beneath" can, therefore, encompass both an orientation of above and below.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

According to various example embodiments, each component (e.g., a module or a program) of the above-described components may include a single entity or multiple entities, and some of the multiple entities may be separately disposed in different components. According to various example embodiments, one or more of the above-described components or operations may be omitted, or one or more other components or operations may be added. Alternatively or additionally, a plurality of components (e.g., modules or programs) may be integrated into a single component. In such a case, according to various example embodiments, the integrated component may still perform one or more functions of each of the plurality of components in the same or similar manner as they are performed by a corresponding one of the plurality of components before the integration. According to various example embodiments, operations performed by the module, the program, or another component may be carried out sequentially, in parallel, repeatedly, or heuristically, or one or more of the operations may be executed in a different order or omitted, or one or more other operations may be added.

Figure 4:
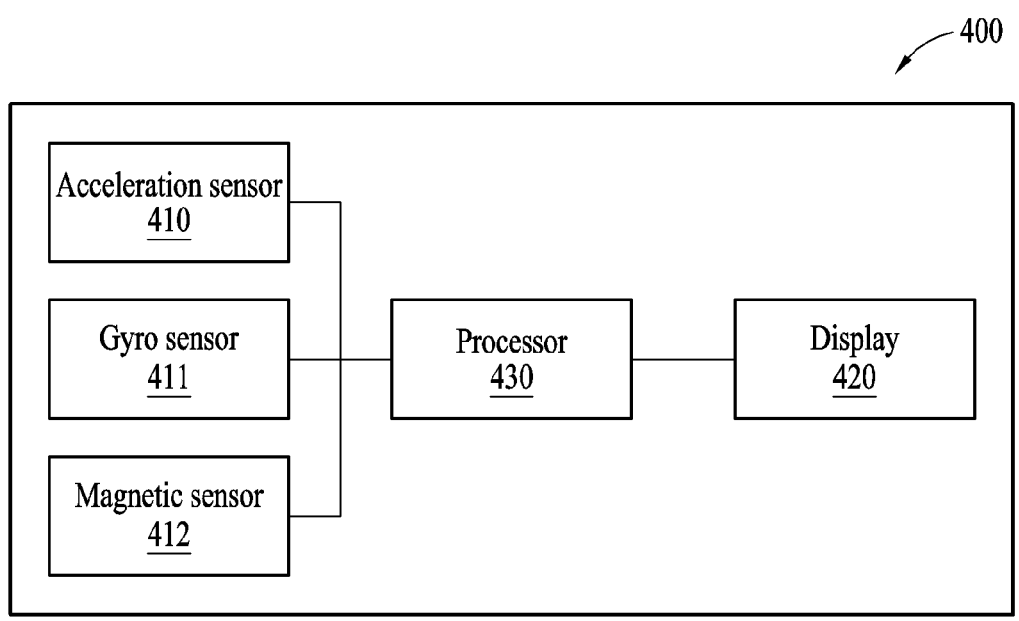
FIG. 4 is a block diagram illustrating an electronic device according to an example embodiment.

FIG. 4 is a block diagram illustrating an electronic device according to an example embodiment.

Referring to FIG. 4, an embodiment of an electronic device 400 (e.g., the electronic device 101 of FIG. 1, the electronic device 200 of FIGS. 2A and 2B, and the electronic device 300 of FIG. 3) may include a plurality of sensors (e.g., an acceleration sensor 410, a gyro sensor 411, and a magnetic sensor 412), a display 420, and a processor 430. At least one selected from the components of the electronic device 400 of FIG. 4 may be the same as or similar to the corresponding components of the electronic device 200 of FIGS. 2A and 2B or the electronic device 300 of FIG. 3, and thus any repetitive detailed description thereof will be omitted for brevity.

According to an example embodiment, the electronic device 400 may be a watch-type wearable electronic device. The electronic device 400 may be a smartwatch, for example.

The sensors 410, 411, and 412 may all be included in a sensor module (e.g., the sensor module 176 of FIG. 1 or the sensor module 211 of FIGS. 2A and 2B). At least two or more of the sensors 410, 411, and 412 may be included in a single chipset or package. In an embodiment, for example, the sensors 410, 411, and 412 may be included in a 9-axis sensor designed as a single chipset.

The acceleration sensor 410 may measure an acceleration of the electronic device 400 and transmit, to the processor 430, a measurement result from the measuring of the acceleration. The measurement result of the acceleration sensor 410 may include, for example, at least one selected from an acceleration signal x corresponding to an acceleration measured in an x-axial direction, an acceleration signal y corresponding to an acceleration measured in a y-axial direction, and an acceleration signal z corresponding to an acceleration measured in a z-axial direction. The processor 430 may then receive the acceleration signal x, the acceleration signal y, and the acceleration signal z from the acceleration sensor 410.

The gyro sensor 411 may measure a rotational angular velocity of the electronic device 400 and transmit, to the processor 430, a measurement result from the measuring of the rotational angular velocity. The measurement result of the gyro sensor 411 may include, for example, at least one selected from an angular velocity signal x corresponding to an angular velocity measured at a rotation of the electronic device 400 around an x-axis as a center (or an axis of rotation), an angular velocity signal y corresponding to an angular velocity measured at a rotation of the electronic device 400 around a y-axis as the center, and an angular velocity signal z corresponding to an angular velocity measured at a rotation of the electronic device 400 around a z-axis as the center. The processor 430 may then receive the angular velocity signal x, the angular velocity signal y, and the angular velocity signal z from the gyro sensor 411.

The magnetic sensor 412 may measure a magnetic field (e.g., geomagnetic field) and transmit, to the processor 430, a measurement result from the measuring of the magnetic field. The measurement result of the magnetic sensor 412 may include, for example, at least one or all of a geomagnetic signal x generated by measuring a geomagnetic field in the x-axial direction, a geomagnetic signal y generated by measuring a geomagnetic field in the y-axial direction, and a geomagnetic signal z generated by measuring a geomagnetic field in the z-axial direction. The processor 430 may then receive the geomagnetic signal x, the geomagnetic signal y, and the geomagnetic signal z from the magnetic sensor 412.

The processor 430 may determine compass information (e.g., a bearing angle and/or incline) based on the measurement result obtained from at least one selected from the sensors 410, 411, and 412, and display the determined compass information on the display 420.

The processor 430 may set a compass information providing mode (or a running mode for providing compass information) to be a permanent running mode or an on-demand running mode based on settings by a user or settings of the electronic device 400. The permanent running mode may refer to a mode for permanently (or continuously) providing the compass information. In an embodiment, for example, when the permanent running mode is set, the processor 430 may execute a digital compass and permanently display the compass information so long as a screen display of the display 420 is activated. The on-demand running mode may refer to a mode for providing the compass information only when there is a request from the user. In an embodiment, for example, when receiving a touch input on an icon (e.g., a compass icon 711 of FIG. 7) for executing a digital compass program from the user, the processor 430 may execute the digital compass program and provide the compass information (or display the compass information on the display 420).

The electronic device 400 may store information associated with a default setting mode. In an embodiment, for example, in a memory (e.g., the memory 130 of FIG. 1) of the electronic device 400, a default value of the compass information providing mode set at the development or manufacture of the electronic device 400 may be stored. The default value may indicate the permanent running mode or the on-demand running mode, and the processor 430 may set the compass information providing mode based on the default value when there is no additional setting by the user.

The permanent running mode may be referred to herein as a first running mode, and the on-demand running mode may be referred to herein as a second running mode.

The processor 430 may correspond to the processor 120 or the main processor 121 of FIG. 1. In an embodiment, for example, the processor 430 may be an application processor (AP) to control an overall operation. In an alternative embodiment, for example, the processor 430 may include an AP (e.g., the main processor 121 of FIG. 1) and a sensor processor (e.g., the auxiliary processor 123 of FIG. 1). In such an embodiment, the sensor processor may perform some of the operations of the processor 430 described herein. In an embodiment, for example, the sensor processor may be electrically or operatively connected to the sensors 410, 411, and 412, and the AP to operate the sensors 410, 411, and 412 and transmit data received from the sensors 410, 411, and 412 to the AP.

The processor 430 may execute at least a portion of the digital compass program. The digital compass program may refer to at least one program that provides compass information based on data received from at least one selected from the sensors 410, 411, and 412. In an embodiment, for example, the digital compass program may be a program including at least one instruction for providing the compass information and at least one instruction for displaying a compass user interface (UI) (provided in a circular compass shape, for example) on the display 420. In such an embodiment, a screen or display provided by the digital compass program may be classified into a compass complication or compass application according to a UI display method. In an alternative embodiment, for example, the digital compass program may include a UI application that provides a compass UI (e.g., a complication and a compass application) and a compass framework that provides compass information to the UI application.

According to an example embodiment, when there is a setting of a display screen (e.g., a watch face) including a compass UI (e.g., a digital compass UI including the digital compass for the convenience of description hereinafter), the processor 430 may set the compass information providing mode to be the permanent running mode. In this case, the processor 430 may permanently update the digital compass UI on the watch face to provide the compass information to the user.

When the watch face including the digital compass is switched to a watch face without the digital compass, the processor 430 may change the compass information providing mode from the permanent running mode to the on-demand running mode.

In an embodiment, for example, when there is a setting by the user for adding a complication of the digital compass to the watch face, the processor 430 may set the compass information providing mode to be the permanent running mode.

In an embodiment, for example, when there is a setting by the user for deleting the complication of the digital compass from the watch face to which the complication of the digital compass is added, the processor 430 may change the compass information providing mode from the permanent running mode to the on-demand running mode.

When the permanent running mode is set, the processor 430 may determine a performance mode of the digital compass to be a low-performance mode. The performance mode of the digital compass may include a performance mode of the sensors 410, 411, and 412, and/or a performance mode of the digital compass program. In an embodiment, for example, when the performance mode of the digital compass is determined, the digital compass program may set related data (e.g., a state flag) to be a value indicating a corresponding performance mode, and may be executed in the determined performance mode. Alternatively, when the performance mode is determined, a sampling rate and/or activation/inactivation may be determined for the sensors 410, 411, and 412.

In the permanent running mode, the sensors 410, 411, and 412 may be activated (or in an activated state). The activated state may be a state in which power is being applied or a greater current than a current applied in an inactivated state is being applied. The inactivated state may be a state in which power is not being applied or a minimum current for maintaining operations is being applied.

The processor 430 may set respective parameters of the sensors 410, 411, and 412 according to the low-performance mode. In an embodiment, for example, when the low-performance mode is set, the processor 430 may set a sampling rate of each of the sensors 410, 411, and 412 to be a first sampling rate (e.g., 20 hertz (Hz)).

The processor 430 may determine low-performance mode-based compass information using the sensors 410, 411, and 412. In an embodiment, for example, the processor 430 may receive respective measurement results that are based on the first sampling rate from the sensors 410, 411, and 412 and determine the compass information based on the received measurement results.

The low-performance mode may also be referred to herein as a first performance mode.

According to an example embodiment, when the on-demand running mode is set, the processor 430 may set the performance mode of the digital compass to be a high-performance mode.

In the on-demand mode, at least one selected from the sensors 410, 411, and 412 may be activated (or in the activated state) when there is a request for providing the compass information from the user. In an embodiment, for example, in response to a request for executing the digital compass from the user, the processor 430 may activate the gyro sensor 411 and the magnetic sensor 412. In such an embodiment, the acceleration sensor 410 may be permanently activated irrespective of the on-demand running mode.

The processor 430 may set respective parameters of the sensors 410, 411, and 412 according to the high-performance mode. In an embodiment, for example, when the high-performance mode is set, the processor 430 may set a sampling rate of each of the sensors 410, 411, and 412 to be a second sampling rate (e.g., 100 Hz).

The processor 430 may determine high-performance mode-based compass information using the sensors 410, 411, and 412. In an embodiment, for example, the processor 430 may receive respective measurement results that are based on the second sampling rate from the sensors 410, 411, and 412 and determine the compass information based on the received measurement results.

The high-performance mode may also be referred to herein as a second performance mode.

The second sampling rate in the high-performance mode may be greater than the first sampling rate in the low-performance mode. That is, current consumption of the sensors 410, 411, and 412 in the low-performance mode for the same amount of time may be smaller than that in the high-performance mode.

According to an example embodiment, the processor 430 may turn on an always on display (AOD) mode of the display 420 according to a setting by the user. When the AOD mode of the display 420 is turned on, the processor 430 may execute the digital compass in a very low-performance mode. In an embodiment, for example, when the AOD mode of the display 420 is turned on while the processor 430 is determining the low-performance mode-based compass information in the permanent running mode, the processor 430 may change the performance mode of the digital compass from the low-performance mode to the very low-performance mode.

The processor 430 may detect or monitor whether there is a movement of the electronic device 400, and execute the digital compass in the very low-performance mode when there is no movement of the electronic device 400. In an embodiment, for example, while determining the low-performance mode-based compass information in the permanent running mode, the processor 430 may determine that there is no movement of the electronic device 400 using the measurement result of the acceleration sensor 410. When there is no movement of the electronic device 400, the processor 430 may change the performance mode of the digital compass from the low-performance mode to the very low-performance mode.

In the very low-performance mode, the processor 430 may inactivate at least one selected from the sensors 410, 411, and 412. In an embodiment, for example, in the very low-performance mode, the processor 430 may inactivate the gyro sensor 411.

In this example, the processor 430 may set respective parameters of the sensors 410 and 412 that are activated in the very low-performance mode. When the very low-performance mode is set, the processor 430 may set a sampling rate of each of the acceleration sensor 410 and the magnetic sensor 412 to be a third sampling rate (e.g., 20 Hz).

The processor 430 may determine very low-performance mode-based compass information using the activated sensors 410 and 412. In an embodiment, for example, the processor 430 may process respective measurement results of the activated sensors 410 and 412 using the third sampling rate, and determine the compass information based on a result of the processing.

The very low-performance mode may also be referred to herein as a third performance mode.

Table 1 below shows each performance mode of the digital compass, a combination of running sensors in each performance mode, and a sampling rate in each performance mode according to an example embodiment.

TABLE 1

| Performance mode | Combination of running sensors | Sampling rate |
| --- | --- | --- |
| High-performance mode | Acceleration sensor, gyro sensor, magnetic sensor | 100 Hz |
| Low-performance mode | Acceleration sensor, gyro sensor, magnetic sensor | 20 Hz |
| Very low-performance mode | Acceleration sensor, magnetic sensor | 20 Hz |

Table 2 below shows each performance mode of the digital compass, a combination of running sensors in each performance mode, and a sampling rate in each performance mode according to an alternative example embodiment.

TABLE 2

| Performance mode | Combination of running sensors | Sampling rate |
| --- | --- | --- |
| High-performance mode | Acceleration sensor, gyro sensor, magnetic sensor | 100 Hz |
| Low-performance mode | Acceleration sensor, magnetic sensor | 50 Hz |
| Very low-performance mode | Acceleration sensor, magnetic sensor | 20 Hz |

Referring to Table 2 above, in the low-performance mode, the gyro sensor 411 may be inactivated, and the processor 430 may determine the compass information based on a combination of the acceleration sensor 410 and the magnetic sensor 412. Referring to Table 2 above, in the low-performance mode, a sampling rate of each of the acceleration sensor 410 and the magnetic sensor 412 may be 50 Hz.

Table 3 below shows each performance mode of the digital compass, a combination of running sensors in each performance mode, and a sampling rate in each performance mode according to another alternative example embodiment.

TABLE 3

| Performance mode | Combination of running sensors | Sampling rate |
| --- | --- | --- |
| High-performance mode | Acceleration sensor, gyro sensor, magnetic sensor | 100 Hz |
| General mode | Acceleration sensor, gyro sensor, magnetic sensor | 50 Hz |
| Low-performance mode | Acceleration sensor, gyro sensor, magnetic sensor | 20 Hz |
| Very low-performance mode | Acceleration sensor, magnetic sensor | 20 Hz |

Referring to Table 3 above, the performance mode of the digital compass may be classified into four. The processor 430 may determine whether to set the high-performance mode or the general mode based on a residual amount of a battery (not shown) when the user requests execution of the digital compass. In an embodiment, for example, when the user requests the execution of the digital compass and a charging state of the battery is greater than or equal to a threshold level, the processor 430 may set the performance mode of the digital compass to be the high-performance mode. When the charging state of the battery is less than the threshold level, the processor 430 may set the performance mode of the digital compass to be the general mode.

In the permanent running mode, the processor 430 may display, on the display 420, a watch face including the digital compass. In the permanent running mode, the processor 430 may determine the low-performance mode-based compass information of the digital compass using the sensors 410, 411, and 412. The processor 430 may provide the low-performance mode-based compass information to the user through the digital compass on the watch face.

When there is an input (e.g., a touch input from the user) to the digital compass on the watch face in the permanent running mode, the processor 430 may execute the digital compass program and display, on the display 420, a full screen of the digital compass program (or a UI corresponding to the full screen of the digital compass program). The processor 430 may change the performance mode of the digital compass from the low-performance mode to the high-performance mode, and determine the high-performance mode-based compass information using the sensors 410, 411, and 412. The processor 430 may display the high-performance mode-based compass information on the full screen of the digital compass program. As the processor 430 determines the compass information based on the high-performance mode, more accurate compass information may be provided to the user through the full screen of the digital compass program.

The processor 430 may operate the digital compass based on a user motion to provide the compass information. In an embodiment, for example, the processor 430 may determine the compass information based on a direction and/or angle in and/or at which the user moves using at least one selected from the sensors 410, 411, and 412, and update at least a portion (e.g., a north pointing arrow) of the compass UI based on the compass information and display the updated compass UI on the display 420.

In the permanent running mode, the processor 430 may display the watch face including the digital compass on the display 420. The processor 430 may determine the low-performance mode-based compass information using the sensors 410, 411, and 412, and provide the determined low-performance mode-based compass information to the user through the digital compass (e.g., the compass UI) on the watch face.

The processor 430 may determine or estimate whether a first motion of the user occurs in the permanent running mode. In an embodiment, for example, the first motion may include a wrist motion of the user detected using at least one selected from the sensors 410, 411, and 412. The first motion may include, for example, a wrist-up motion of the user, but not being limited thereto. When determining or estimating that the first motion of the user occurs, the processor 430 may determine or estimate whether the user gazes at the display 420.

When determining or estimating that the user gazes at the display 420, the processor 430 may change the performance mode of the digital compass from the low-performance mode to the high-performance mode. The processor 430 may determine the high-performance mode-based compass information using the sensors 410, 411, and 412 and display the determined high-performance mode-based compass information on the display 420. When determining or estimating that the first motion of the user occurs and the user gazes at the display 420, the processor 430 may estimate (or determine) that the user gazes at the digital compass on the watch face. Based on such an estimation, the processor 430 may determine and display the high-performance mode-based compass information and may thereby provide more accurate compass information to the user.

While determining the low-performance mode-based compass information in the permanent running mode, the processor 430 may verify whether the electronic device 400 is being charged or not. When determining that the electronic device 400 is being charged in the permanent running mode, the processor 430 may suspend determining the low-performance mode-based compass information. In an embodiment, for example, while the sensors 410, 411, and 412 is being in the activated state in the permanent running mode, the processor 430 may inactivate the magnetic sensor 412 in case the electronic device 400 is being charged in the permanent running mode.

Figure 5:
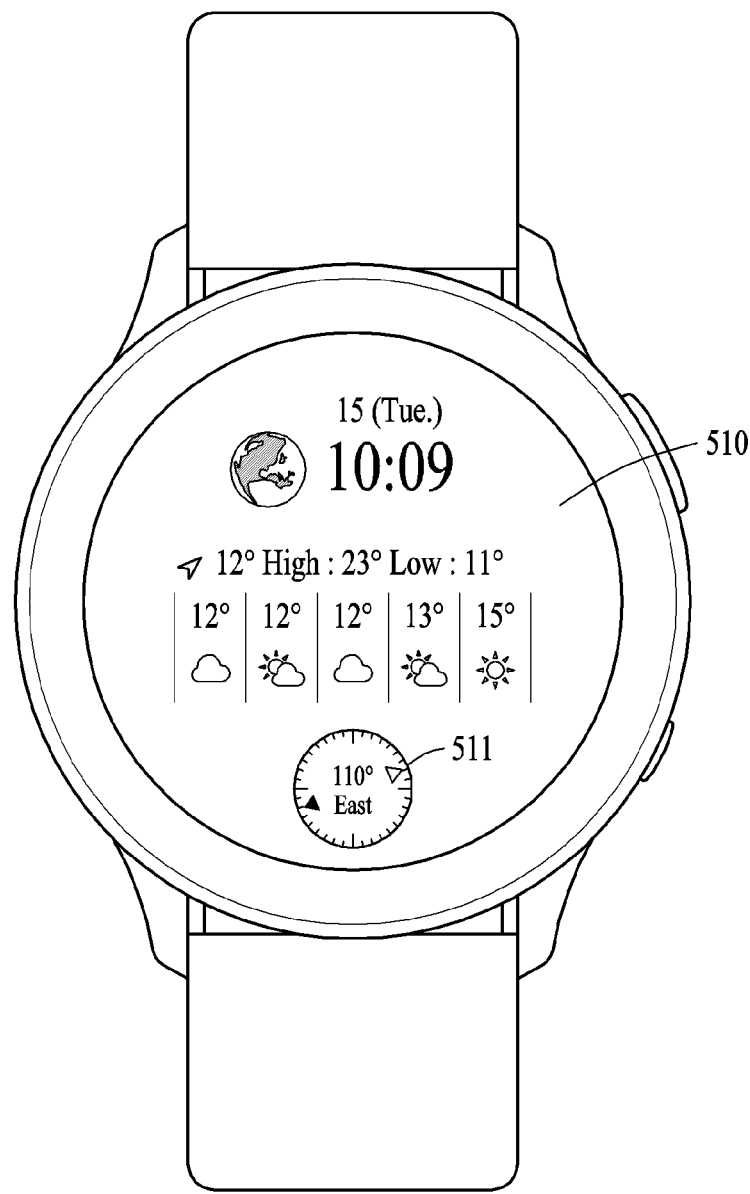
FIG. 5 is a diagram illustrating an example watch face of an electronic device according to an example embodiment.

FIG. 5 is a diagram illustrating an example watch face of an electronic device according to an example embodiment.

Referring to FIG. 5, in an embodiment, a watch face 510 may include a digital compass 511.

According to an example embodiment, when there is a setting by a user for adding a complication of the digital compass 511 to the watch face 510, the processor 430 may expose or display the digital compass (or a compass UI) 511 on the watch face 510. The complication may include, for example, at least one UI or application included with a set size in a watch face. The complication may display various types of information (e.g., the number of steps, heart rate, and compass information) on the watch face. Each complication may be a single application or be included as part of a related application. The complication may also be referred to as a widget. The setting made by the user to add the complication of the digital compass 511 to the watch face 510 may be generated by an operation or manipulation performed by the user on the electronic device 400 or received from an external electronic device (not shown). The external electronic device may include, for example, a user terminal (e.g., a smartphone, a tablet PC, etc.) that is wirelessly connectable to the electronic device 400 (through Bluetooth™, for example).

In an embodiment, for example, while a watch face without such a complication of the digital compass 511 is being displayed on the display 420, the processor 430 may receive or detect a touch input selecting a complication adding function from the user. When receiving or detecting the touch input selecting the complication adding function, the processor 430 may display various types of complications (e.g., heart rate, digital compass, and the number of steps) on the display 420. When the user selects the complication of the digital compass 511, the processor 430 may expose the digital compass 511 (or the compass UI) on the watch face 510 as illustrated in FIG. 5.

In an alternative embodiment, for example, the electronic device 400 may receive, from an external electronic device (not shown), the setting by the user for adding the complication of the digital compass 511 to the watch face 510. The electronic device 400 may be wirelessly connected to the external electronic device. The external electronic device may display various types of complications (e.g., heart rate, digital compass, and the number of steps) on its display, and the user may select the complication of the digital compass 511 from among the complications displayed on the display. When the user selects the complication of the digital compass 511, the external electronic device may transmit, to the electronic device 400, a first signal indicating that the user selects the complication of the digital compass 511. When receiving the first signal from the external electronic device, the processor 430 may add the complication of the digital compass 511 to the watch face 510 and display the watch face 510 including the digital compass 511 (or the compass UI) on the display 420.

In response to the setting by the user to add the complication of the digital compass 511 to the watch face 510, the processor 430 may set a compass information providing mode to be a permanent running mode.

According to an example embodiment, a compass UI indicating a digital compass may include various UI elements. The compass UI may include, for example, at least one selected from a bearing scale, a north indicating arrow, a south indicating arrow, and bearing information. In an embodiment, for example, the processor 430 may determine a pointing direction of the north indicating arrow based on a northward direction changed based on a direction in which the electronic device 400 faces, and update and display the north indicating arrow and/or the bearing scale based on the determined pointing direction. In such an embodiment, when the compass UI is set to display the bearing information, the processor 430 may display a direction facing a reference position (e.g., a longitudinal centerline) of the electronic device 400 with respect to the north, but embodiments of the bearing information to be displayed are not limited thereto. According to an example embodiment, a plurality of watch faces may be stored in the electronic devices 400. In such an embodiment, when there is a setting by the user to display, on the display 420, the watch face 510 including the digital compass 511 among the watch faces, the processor 430 may display the watch face 510 including the digital compass 511 on the display 420. The setting made by the user to display the watch face 510 including the digital compass 511 on the display 420 may be generated by an operation or manipulation of the user on the electronic device 400 or received from an external electronic device (not shown), for example.

In an embodiment, for example, while a watch face that does not include the digital compass 511 (e.g., a watch face different from the watch face 510 of FIG. 5) is being displayed on the display 420, the user may apply an input (e.g., a touch input) to the watch face. In response to the input from the user to the watch face, the processor 430 may display a plurality of watch faces on the display 420. When the user selects the watch face 510 including the digital compass 511 from among the watch faces, the processor 430 may display the selected watch face 510 on the display 420.

In an alternative embodiment, for example, the electronic device 400 may receive, from an external electronic device, a setting by the user to display the watch face 510 including the digital compass 511 on the display 420. The external electronic device may display a plurality of watch faces on its display, and the user may select the watch face 510 including the digital compass 511 from among the watch faces displayed on the display. The external electronic device may transmit, to the electronic device 400, a second signal indicating that the user selects the watch face 510 including the digital compass 511. When receiving the second signal from the external electronic device, the processor 430 may display the watch face 510 including the digital compass 511 on the display 420.

In response to the setting by the user to display the watch face 510 including the digital compass 511 on the display 420 among the watch faces, the processor 430 may set the compass information providing mode to the permanent running mode.

In an embodiment shown in FIG. 5, the processor 430 may determine low-performance mode-based compass information, and provide the determined low-performance mode-based compass information to the user through the digital compass 511. In an embodiment, for example, the processor 430 may display or apply the low-performance mode-based compass information on or to the digital compass 511.

According to an example embodiment, as shown in FIG. 5, the size of the UI of the digital compass 511 may be relatively small, and may thus not considerably compromise a user experience although an update period of the UI of the digital compass 511 increases. In an embodiment shown in FIG. 5, the processor 430 may set the update period of the UI of the digital compass 511 to be relatively long. In an embodiment, for example, the processor 430 may determine the update period of the UI of the digital compass 511 based on a sampling rate (e.g., 20 Hz) in a low-performance mode, or set the update period to be the same as the sampling rate in the low-performance mode. In an embodiment shown in FIG. 5, the processor 430 may set the update period of the UI of the digital compass 511 to be relatively long, thereby reducing current consumption.

Figure 6:
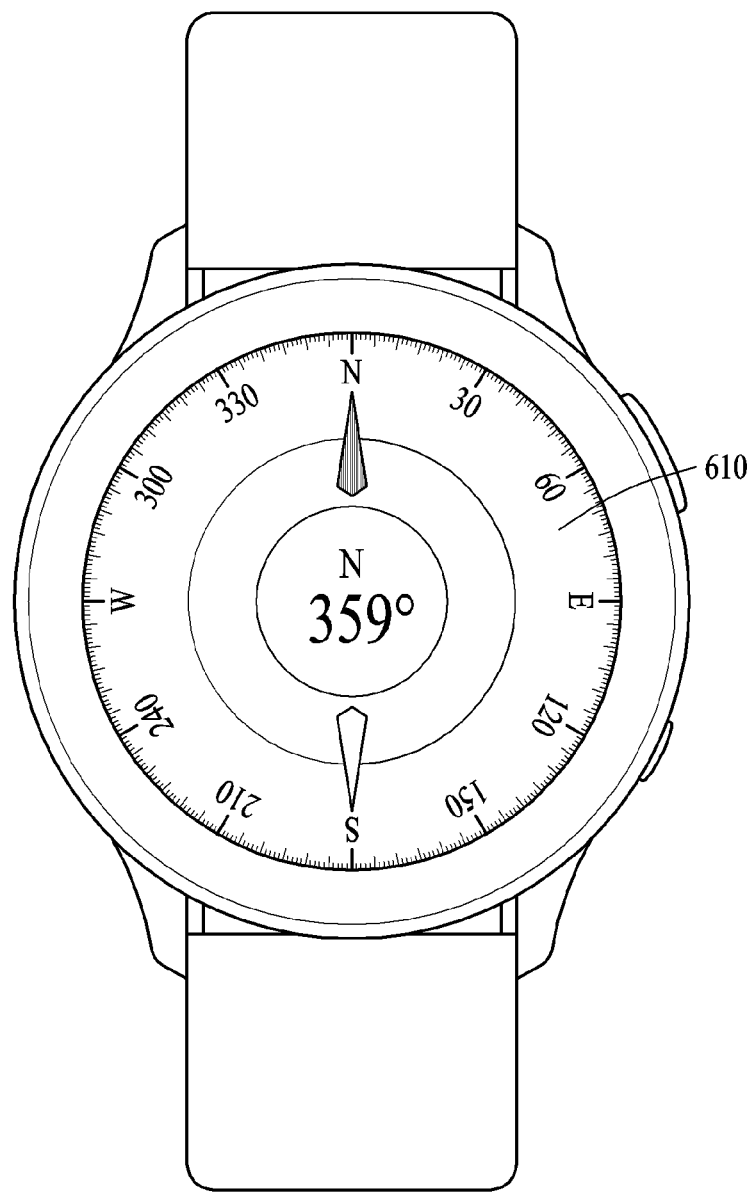
FIG. 6 is a diagram illustrating an example compass face of an electronic device according to an example embodiment.

FIG. 6 is a diagram illustrating an example compass face of an electronic device according to an example embodiment.

According to an example embodiment, when receiving an input (e.g., a touch input from a user) to a digital compass (e.g., the digital compass 511 of FIG. 5) on a watch face (e.g., the watch face 510 of FIG. 5), or when receiving an input to a compass icon (e.g., a compass icon 711 of FIG. 7) for executing a compass (e.g., a digital compass application), the processor 430 may display a compass face (e.g., a compass face 610 of FIG. 6) on the display 420c. In an embodiment, for example, a compass UI included in the compass face 610 may be displayed in a size that fills a substantially entire display area of the display 420.

The processor 430 may set a performance mode of the digital compass in a permanent running mode to be a low-performance mode to determine compass information, and provide the determined compass information to the user through the digital compass on the watch face (e.g., the watch face 510 of FIG. 5). When there is an input from the user to the digital compass on the watch face in the permanent running mode, the processor 430 may change the performance mode from the low-performance mode to a high-performance mode and determine high-performance mode-based compass information. The processor 430 may then display, on the display 420, the compass face (e.g., the compass face 610 of FIG. 6) including the determined high-performance mode-based compass information.

In an embodiment shown in FIG. 6, the processor 430 may decrease an update period of the compass UI to be relatively shorter. In an embodiment, for example, the processor 430 may determine the update period of the UI of the digital compass on the compass face 610 based on a sampling rate (e.g., 100 Hz) in the high-performance mode, or determine the update period to be the same as the sampling rate in the high-performance mode. The processor 430 may provide more accurate compass information to the user. The processor 430 may allow a needle of the digital compass on the compass face 610 to move more smoothly, thereby improving a user experience.

When the display 420 is dimmed as no additional input is received from the user (or the electronic device 400 is left unattended) while the high-performance mode-based compass information is being displayed on the compass face 610, the processor 430 may change the performance mode of the digital compass to a low-performance mode and determine compass information, while maintaining the display of the compass face 610. When the display 420 is completely activated as an input is received from the user afterward, the processor 430 may change the performance mode of the digital compass to the high-performance mode.

Figure 7:
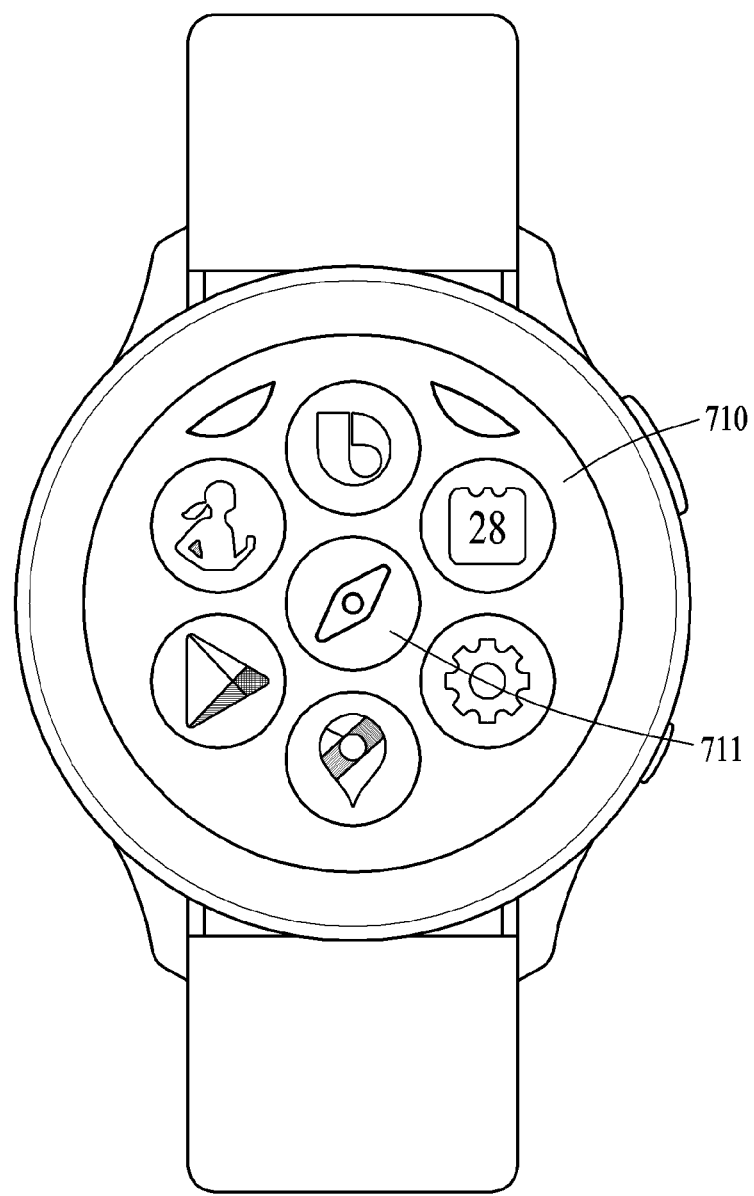
FIG. 7 is a diagram illustrating an example application shortcut of an electronic device according to an example embodiment.

FIG. 7 is a diagram illustrating an example application shortcut of an electronic device according to an example embodiment.

Referring to FIG. 7, according to an example embodiment, the processor 430 may display an application shortcut 710 on the display 420.

The application shortcut 710 may include a compass icon 711 for executing a digital compass (or a digital compass application).

When there is an input (e.g., a touch input from a user) to the compass icon 711, the processor 430 may determine high-performance mode-based compass information and display the determined high-performance mode-based compass information on the display 420. In an embodiment, for example, the processor 430 may display the application shortcut 710 on the display 420 based on an operation performed by the user on the electronic device 400 while determining low-performance mode-based compass information in a permanent running mode. In response to the input from the user to the compass icon 711 on the application shortcut 710, the processor 430 may execute the digital compass application and display a full screen (e.g., the compass face 610 of FIG. 6) of the digital compass application on the display 420. As the digital compass is executed, the processor 430 may change a performance mode of the digital compass from a low-performance mode to a high-performance mode and determine the high-performance mode-based compass information. The processor 430 may display, on the display 420, a compass face (e.g., the compass face 610 of FIG. 6) including the high-performance mode-based compass information.

Figure 8:
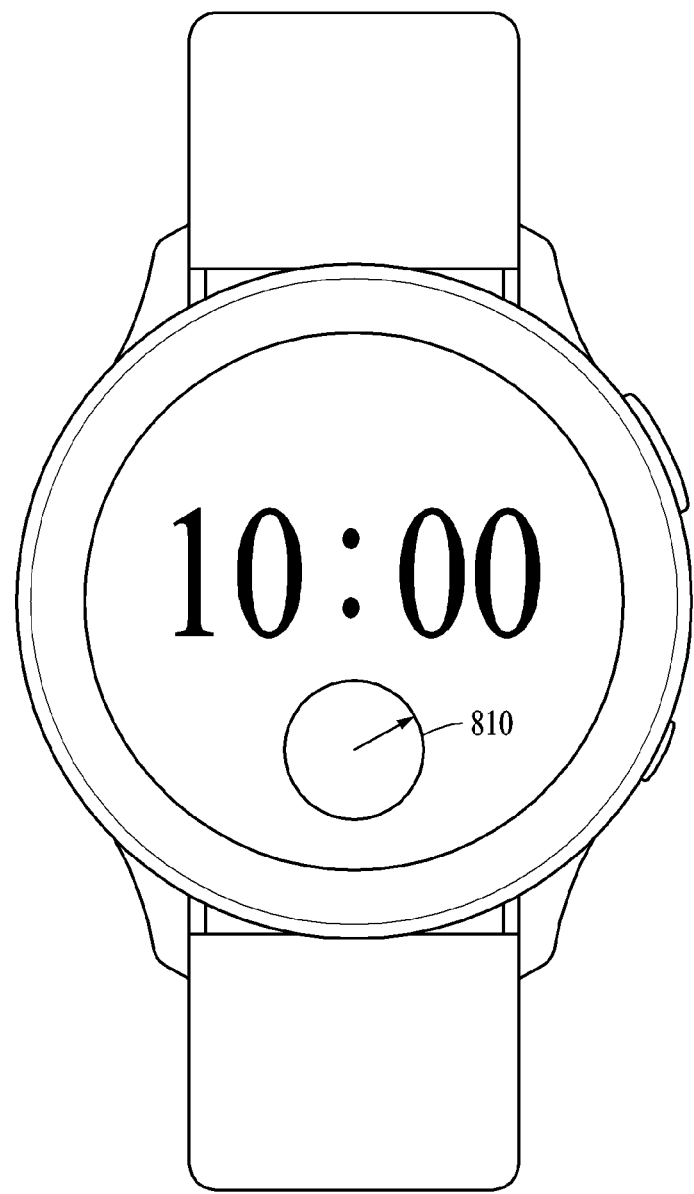
FIG. 8 is a diagram illustrating an example always on display (AOD) of an electronic device according to an example embodiment.

FIG. 8 is a diagram illustrating an example AOD of an electronic device according to an example embodiment.

Referring to FIG. 8, according to an example embodiment, the processor 430 may display a digital compass 810 on an AOD.

When an AOD mode of the display 420 is turned on, the processor 430 may execute the digital compass 810 in a very low-performance mode. In an embodiment, for example, when the AOD mode of the display 420 is turned on while the processor 430 is determining low-performance mode-based compass information, the processor 430 may change a performance mode of the digital compass 810 from a low-performance mode to the very low-performance mode, and determine very low-performance mode-based compass information and display the determined very low-performance mode-based compass information on the AOD. In an embodiment, for example, in the very low-performance mode, the processor 430 may determine compass information using the acceleration sensor 410 and the magnetic sensor 412 without running the gyro sensor 411, thereby reducing current (or power) consumption by compass execution in the very low-performance mode to be less than current consumption by compass execution in the low-performance mode.

A UI of the digital compass 810 of FIG. 8 may be simpler than the UI of the digital compass 511 of FIG. 5. In an embodiment, for example, a numeral indicating a bearing angle may be displayed as illustrated in FIG. 5, while the numeral may not be displayed as illustrated in FIG. 8. Alternatively, only a north indicating arrow that points the north may be displayed without a direction indicating scale. Alternatively, a text corresponding to a bearing closest to a measured bearing may be displayed. In an embodiment, for example, among eight bearings (e.g., north, northeast, east, southeast, south, southwest, west, and northwest), a text corresponding to a bearing (e.g., northeast) closest to a measured bearing angle may be displayed. The foregoing eight bearings are provided merely as an example, and embodiments of the bearing are not limited thereto and more sub-divided bearings (e.g., 16 bearings, 24 bearings, etc.) may also be applicable.

According to an example embodiment, a UI of a digital compass in a very low-performance mode may be the same as a UI of the digital compass in a low-performance mode. According to an example embodiment, an update period of the UI of the digital compass in the very low-performance mode may be greater (or longer) than an update period of the UI of the digital compass in the low-performance mode.

Figure 9:
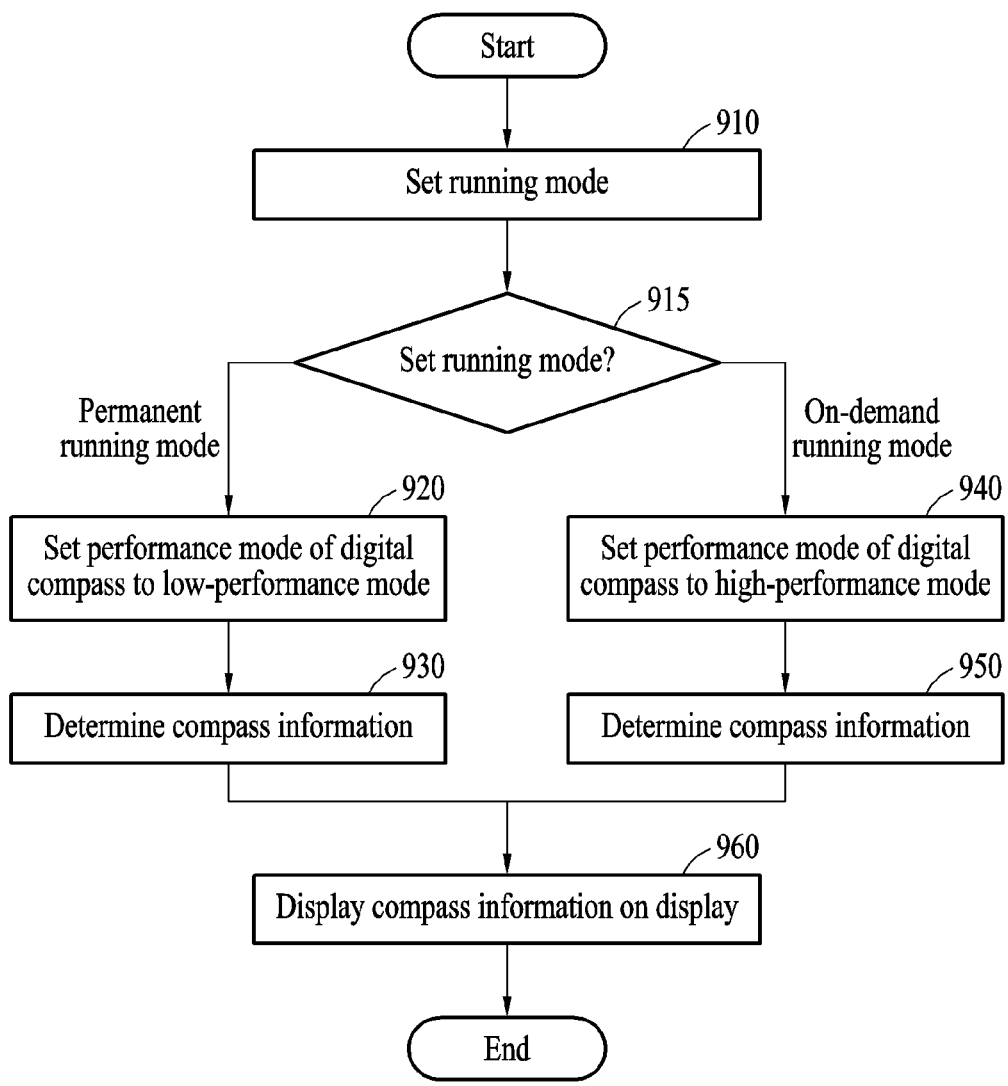
FIG. 9 is a flowchart illustrating an example flow of operations of an electronic device according to an example embodiment.

FIG. 9 is a flowchart illustrating an example flow of operations of an electronic device according to an example embodiment.

According to an example embodiment, in operation 910, a processor (e.g., the processor 430 of FIG. 4) of an electronic device (e.g., the electronic device 400 of FIG. 4) may set a compass information providing mode. In operation 910, the processor 430 may set a permanent running mode or an on-demand running mode based on a setting by a user. In an embodiment, for example, where there is a setting by the user to add a complication of a digital compass to a watch face or when there is a setting by the user to display a watch face including a digital compass, the processor 430 may execute the digital compass and set the compass information providing mode to be the permanent running mode. In such an embodiment, when there is a setting by the user to remove the digital compass from the watch face in the permanent running mode or when there is a setting by the user to switch the watch face including the digital compass to another watch face, the processor 430 may change the compass information providing mode from the permanent running mode to the on-demand running mode. In an embodiment, for example, the processor 430 may display, on a display (e.g., the display 420 of FIG. 4), a first soft button for setting the permanent running mode and a second soft button for setting the on-demand running mode. In such an embodiment, the processor 430 may set the compass information providing mode to be the permanent running mode when the user selects the first soft button, and to be the on-demand running mode when the user selects the second soft button. The electronic device 400 may set the compass information providing mode based on default mode data stored in a memory (e.g., the memory 130 of FIG. 1) at development or manufacture.

In operation 915, the processor 430 may verify the set running mode.

In operation 920, when the set running mode is the permanent running mode, the processor 430 may set a performance mode of the digital compass to be a low-performance mode. When the low-performance mode is set, the processor 430 may change a sampling rate of sensors (e.g., the sensors 410, 411, and 412 of FIG. 4) to be a value corresponding to the low-performance mode, and/or activate only a portion of the sensors 410, 411, and 412. In an embodiment, for example, the processor 430 may set a sampling rate of each of the sensors 410, 411, and 412 to be a first sampling rate. In an alternative embodiment, for example, the processor 430 may permanently activate (or run) the acceleration sensor 410 irrespective of the set permanent running mode and inactivate the gyro sensor 411 and/or the magnetic sensor 411 before the setting of the permanent running mode. As the permanent running mode is set, the processor 430 may activate or run the gyro sensor 411 and/or the magnetic sensor 411 that are previously inactivated. In the permanent running mode, the activated sensors may perform measurements based on the sampling rate (e.g., the first sampling rate) set according to the low-performance mode and transmit measurement results to the processor 430.

In operation 930, the processor 430 may determine low-performance mode-based compass information. In an embodiment, for example, the processor 430 may determine the low-performance mode-based compass information based on the measurement results of the activated sensors.

In operation 940, when the set running mode is the on-demand running mode, the processor 430 may set the performance mode of the digital compass to be a high-performance mode. In an embodiment, for example, when there is a request from the user to execute the digital compass (e.g., when the user pushes the compass icon 711 of FIG. 7), the processor 430 may execute the digital compass and set the performance mode of the digital compass to be the high-performance mode. In the high-performance mode, the processor 430 may use all the sensors 410, 411, and 412. In an embodiment, for example, when some of the sensors 410, 411, and 412 are inactivated, the processor 430 may activate all the inactivated sensors. The processor 430 may set a sampling rate of each of the sensors 410, 411, and 412 to be a second sampling rate.

In operation 950, the processor 430 may determine high-performance mode-based compass information. Each of the sensors 410, 411, and 412 may perform a measurement based on the sampling rate (e.g., the second sampling rate) set according to the high-performance mode and transmit a measurement result to the processor 430. The processor 430 may determine the high-performance mode-based compass information based on the measurement result of each of the sensors 410, 411, and 412.

In operation 960, the processor 430 may display compass information on the display 420. In the low-performance mode, the processor 430 may provide the low-performance mode-based compass information to the user through the digital compass on the watch face (e.g., the watch face 510 of FIG. 5). Alternatively, in the high-performance mode, the processor 430 may provide the high-performance mode-based compass information to the user through the digital compass on a compass face (e.g., the compass face 610 of FIG. 6).

According to an example embodiment, the processor 430 may receive, from a 9-axis sensor (e.g., a 9-axis sensor including the sensors 410, 411, and 412), sensor data sampled at the first sampling rate according to the low-performance mode in the permanent running mode (alternatively, receive, from an activated sensor of the 9-axis sensor, sensor data sampled at the first sampling rate of the activated sensor), and determine compass information based on the sensor data sampled at the first sampling rate. The processor 430 may receive, from the 9-axis sensor, sensor data sampled at the second sampling rate according to the high-performance mode in the on-demand running mode, and determine compass information based on the sensor data sampled at the second sampling rate. The electronic device 400 may process sensor data at different sampling rates according to the running mode for providing compass information to the user or the performance mode, thereby reducing current consumption.

Other features of example embodiments described above with reference to FIGS. 1 through 8 are applicable to example embodiments described above with reference to FIG. 9, and thus any repetitive detailed description of the same or like features will be omitted here.

Figure 10:
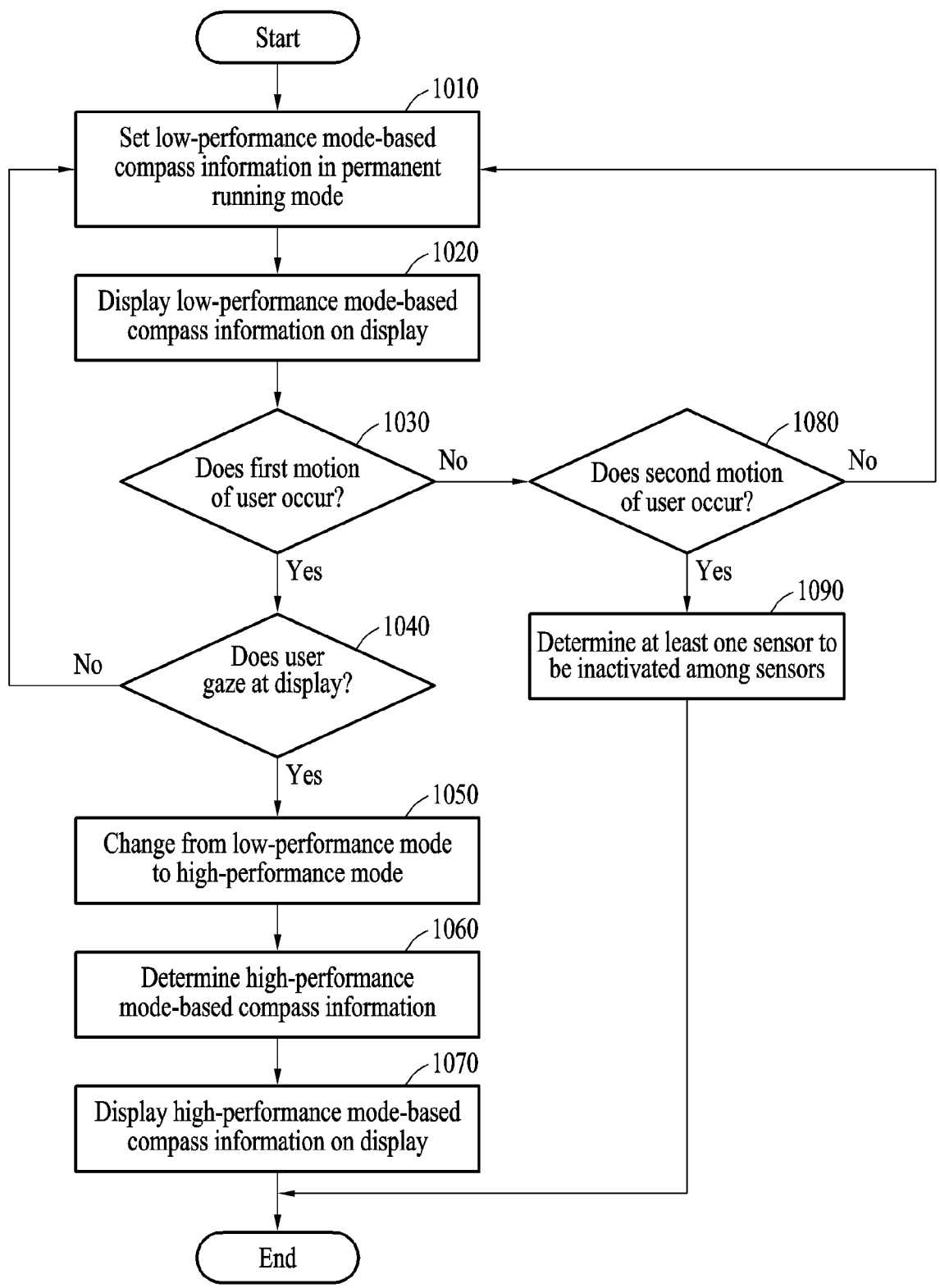
FIG. 10 is a flowchart illustrating another example flow of operations of an electronic device according to an example embodiment.

FIG. 10 is a flowchart illustrating another example flow of operations of an electronic device according to an example embodiment.

According to an example embodiment, the processor 430 may determine low-performance mode-based compass information in a permanent running mode in operation 1010, and display the determined low-performance mode-based compass information on the display 420 in operation 1020. The processor 430 may provide the low-performance mode-based compass information to a user by displaying, on the display 420, a watch face including a digital compass.

In operation 1030, the processor 430 may determine whether a first motion of the user occurs. In an embodiment, for example, the processor 430 may determine whether the first motion of the user occurs using the acceleration sensor 410.

The first motion may include a wrist motion of the user. In an embodiment, for example, the first motion may include a wrist-up motion of the user, but not being limited thereto.

In operation 1040, when determining that the first motion of the user occurs, the processor 430 may determine whether the user gazes at the display 420. In an embodiment, for example, the processor 430 may calculate a FOV vector (or gaze vector) angle as represented by Equation 1 below, and determine that the user gazes at the display 420 when the calculated FOV vector angle is in a range (e.g., in a range of 0° to 45°).

$$\text{magnitude} = \sqrt{acc_x^2 + acc_y^2 + acc_z^2} \qquad \text{[Equation 1]}$$
$$FOV = \arcsin(acc_z, \text{magnitude})$$

In Equation 1 above, $acc_x$ denotes an acceleration measured in an x-axial direction, $acc_y$ denotes an acceleration measured in a y-axial direction, and $acc_z$ denotes an acceleration measured in a z-axial direction. In addition, magnitude denotes an acceleration magnitude.

In Equation 1 above, arcsin( ) denotes an arcsine function, and FOV denotes a FOV vector angle. The processor 430 may calculate, to be the FOV vector angle, a ratio between the acceleration magnitude represented in Equation 1 and the acceleration measured in the z-axial direction.

As described above with reference to FIG. 3, the display 420 (or a screen) of the electronic device 400 may correspond to an xy plane, and a FOV vector may correspond to an up vector.

Table 4 below shows an example of a description according to a FOV vector angle.

TABLE 4

| FOV vector angle | Description |
|---|---|
| −90° | The screen of the electronic device 400 is parallel to the ground, facing the ground. |
| 0 | The screen of the electronic device 400 is perpendicular to the ground. |
| 90° | The screen of the electronic device 400 is parallel to the ground, facing the air (e.g., the electronic device 400 is on a table). |
| 0-45° | The user views the screen of the electronic device 400. |

In an embodiment, for example, when the FOV vector angle is 90° and there is no movement of the electronic device 400, the processor 430 may estimate or determine that the electronic device 400 is on the table, and execute the digital compass in a very low-performance mode.

In operation 1050, when determining that the user gazes at the display 420, the processor 430 may change the performance mode of the digital compass from the low-performance mode to the high-performance mode. In operation 1050, the processor 430 may activate at least one inactivated sensor, and change a sampling rate of the activated sensor from a first sampling rate (e.g., 20 Hz) to a second sampling rate (e.g., 100 Hz).

In operation 1060, the processor 430 may determine high-performance mode-based compass information. In operation 1070, the processor 430 may display the determined high-performance mode-based compass information on the display 420.

When determining that the user does not gaze at the display 420 in operation 1040, the processor 430 may perform operation 1010.

The processor 430 may determine that the first motion of the user does not occur in operation 1030. In operation 1080, when determining that the first motion of the user does not occur, the processor 430 may determine whether a second motion (e.g., walking) of the user occurs.

In operation 1090, when determining that the second motion of the user occurs, the processor 430 may determine at least one sensor to be inactivated among the sensors 410, 411, and 412. In an embodiment, for example, the processor 430 may determine the magnetic sensor 412 to be inactivated in operation 1090.

When determining that the second motion of the user does not occur, the processor 430 may not perform an operation of determining the low-performance mode-based compass information. That is, when the first motion of the user does not occur, but the second motion of the user occurs, the processor 430 may determine that the user walks without viewing the watch face, and may not provide the low-performance mode-based compass information to the user based on such a determination.

When determining that the second motion of the user does not occur in operation 1080, the processor 430 may perform operation 1010.

Other features of example embodiments described above with reference to FIGS. 1 through 9 are applicable to example embodiments described above with reference to FIG. 10, and any repetitive detailed description of the same or like features will be omitted here.

According to an example embodiment, an electronic device (e.g., the electronic device 400 of FIG. 4) may include a plurality of sensors (e.g., 410, 411, and 412), a display (e.g., 420), and a processor (e.g., 430) electrically connected to the sensors and the display. The electronic device may be set to be in a first running mode (e.g., a permanent running mode) for permanently providing compass information and a second running mode (e.g., an on-demand running mode) for providing the compass information in response to a request from a user (e.g., a request for execution of a digital compass). When the first running mode is set, the processor may set a performance mode of a digital compass to be a first performance mode (e.g., a low-performance mode). When the first performance mode is set, the processor may determine first performance mode-based compass information using the sensors and display the determined first performance mode-based compass information on the display. When the second running mode is set, the processor may set the performance mode of the digital compass to be a second performance mode (e.g., a high-performance mode), and determine second performance mode-based compass information using the sensors at the request of the user and display the determined second performance mode-based compass information on the display.

The processor may set a sampling rate of each of the sensors in the first performance mode to be a first sampling rate, and set a sampling rate of each of the sensors in the second performance mode to be a second sampling rate.

The second sampling rate may be greater than the first sampling rate.

The sensors may be permanently activated in the first running mode, and at least one selected from the sensors may be activated at the request from the user in the second running mode.

When there is a setting by the user to add the digital compass to a display screen (e.g., a watch face) on the display, the processor may operate in the first running mode.

When there is an input to the digital compass on the watch face in the first running mode, the processor may change the first performance mode to the second performance mode to determine second performance mode-based compass information, and display a compass face (e.g., the compass face 610 of FIG. 6) including the determined second performance mode-based compass information on the display.

When an AOD mode of the display is turned on in the first running mode, the processor may change the performance mode of the digital compass from the first performance mode to a third performance mode (e.g., a very low-performance mode).

In the third performance mode, the processor 430 may inactivate at least one selected from the sensors and determine third performance mode-based compass information using remaining activated sensors among the sensors.

When there is no movement of the electronic device in the first running mode, the processor may inactivate at least one selected from the sensors by changing the performance mode from the first performance mode to the third performance mode, and determine the third performance mode-based compass information using the remaining activated sensors among the sensors.

The processor may determine whether the electronic device is in a charging state in the first running mode, and suspend determining the first performance mode-based compass information when the electronic device is determined to be in the charging state.

According to an example embodiment, an electronic device (e.g., 400) may include a plurality of sensors (e.g., 410, 411, and 412), a display (e.g., 420), and a processor (e.g., 430) electrically connected to the sensors and the display. The processor may display, on the display, a watch face (e.g., the watch face 510 of FIG. 5) including a digital compass in a permanent running mode that permanently provides compass information. The processor may determine first performance mode-based compass information using the sensors and provide the determined first performance mode-based compass information to a user. When there is an input to the digital compass on the watch face, the processor may change a performance mode of the digital compass from a first performance mode to a second performance mode. The processor may determine second performance mode-based compass information using the sensors and display, on the display, a compass face including the determined second performance mode-based compass information.

The processor may set a sampling rate of each of the sensors in the first performance mode to be a first sampling rate, and set a sampling rate of each of the sensors in the second performance mode to be a second sampling rate.

When there is no movement of the electronic device in the permanent running mode, the processor may change the first performance mode to a third performance mode, and inactivate at least one of the sensors and determine third performance mode-based compass information using remaining activated sensors among the sensors.

According to an example embodiment, an electronic device (e.g., 400) may include a plurality of sensors (e.g., 410, 411, and 412), a display (e.g., 420), and a processor (e.g., 430) electrically connected to the sensors and the display. The processor may determine first performance mode-based compass information of a digital compass using the sensors in a permanent running mode that permanently provides compass information, and display the determined first performance mode-based compass information on the display. The processor may determine whether a first motion of a user occurs, and determine whether the user gazes at the display when determining that the first motion occurs. When determining that the user gazes at the display, the processor may change a performance mode of the digital compass from a first performance mode to a second performance mode. The processor may determine second performance mode-based compass information using the sensors and display the determined second performance mode-based compass information on the display.

When determining that the first motion does not occur, the processor may determine whether a second motion of the user occurs. When determining that the second motion occurs, the processor may then suspend determining the first performance mode-based compass information and inactivate at least one of the sensors.

The processor may calculate an acceleration magnitude using an acceleration value in a first axial (e.g., z-axial) direction, an acceleration value in a second axial (e.g., x-axial) direction, and a third axial (e.g., y-axial) direction, and determine whether the user gazes at the display using the calculated acceleration magnitude and the acceleration value of the first axial direction.

According to an example embodiment, a method of operating an electronic device (e.g., 400) may include setting a performance mode of a digital compass to be a first performance mode when, of a first running mode for permanently providing compass information and a second running mode for providing the compass information in response to a request from a user, the first running mode is set, determining first performance mode-based compass information using a plurality of sensors (e.g., 410, 411, and 412) of the electronic device, displaying the determined first performance mode-based compass information on a display (e.g., 420) of the electronic device, setting the performance mode of the digital compass to be a second performance mode when the second running mode is set, and determining second performance mode-based compass information using the sensors at the request of the user, and displaying the determined second performance mode-based compass information on the display.

While the disclosure has been shown and described with reference to certain embodiments thereof, it will be understood by those skilled in the art that various changes in form and details may be made therein without departing from the scope of the disclosure. Therefore, the scope of the disclosure should not be defined as being limited to the embodiments, but should be defined by the appended claims and equivalents thereof.

What is claimed is:

1. An electronic device, comprising:
   a plurality of sensors;
   a display;
   memory storing instructions; and
   at least one processor including processing circuitry,
   wherein the electronic device is in a first running mode for permanently providing compass information or a second running mode for providing the compass information, in response to a request from a user, and
   wherein the instructions, when executed by the at least one processor individually or collectively, cause the electronic device to:
   when the electronic device is set to be in the first running mode, set a performance mode of a digital compass to be a first performance mode, determine first performance mode-based compass information using the plurality of sensors, and display the determined first performance mode-based compass information on the display, and
   when the electronic device is set to be in the second running mode, set the performance mode of the digital compass to be a second performance mode, determine second performance mode-based compass information using the plurality of sensors at the request from the user, and display the determined second performance mode-based compass information on the display,
   wherein a sampling rate of a first sensor of the plurality of sensors is a first sampling rate in the first performance mode and the sampling rate of the first sensor is a second sampling rate greater than the first sampling rate in the second performance mode.

2. The electronic device of claim 1, wherein the instructions, when executed by the at least one processor individually or collectively, cause the electronic device to:
   set the sampling rate of each of the plurality of sensors to be the first sampling rate in the first performance mode, and
   set the sampling rate of each of the plurality of sensors to be the second sampling rate in the second performance mode.

3. The electronic device of claim 1, wherein the plurality of sensors are permanently activated in the first running mode, and at least one selected from the plurality of sensors is activated at the request from the user in the second running mode.

4. The electronic device of claim 1, wherein the instructions, when executed by the at least one processor individually or collectively, cause the electronic device to
   when there is a setting by the user to add the digital compass to a display screen on the display, operate in the first running mode.

5. The electronic device of claim 4, wherein the instructions, when executed by the at least one processor individually or collectively, cause the electronic device to:
   when there is an input to the digital compass on the display screen in the first running mode, change the performance mode of the digital compass from the first performance mode to the second performance mode, determine the second performance mode-based compass information, and display, on the display, a compass face comprising the second performance mode-based compass.

6. The electronic device of claim 1, wherein the instructions, when executed by the at least one processor individually or collectively, cause the electronic device to:
   when an always on display mode of the display is turned on in the first running mode, the processor changes the performance mode of the digital compass from the first performance mode to a third performance mode.

7. The electronic device of claim 6, wherein the instructions, when executed by the at least one processor individually or collectively, cause the electronic device to inactivate at least one selected from the plurality of sensors in the third performance mode, and determine third performance mode-based compass information using an activated sensor among the plurality of sensors.

8. The electronic device of claim 1, wherein the instructions, when executed by the at least one processor individually or collectively, cause the electronic device to:

when there is no movement of the electronic device in the first running mode, change the performance mode of the digital compass from the first performance mode to a third performance mode, and inactivate at least one selected from the plurality of sensors and determine third performance mode-based compass information using an activated sensor among the plurality of sensors.

9. The electronic device of claim 1, wherein the instructions, when executed by the at least one processor individually or collectively, cause the electronic device to:

determine whether the electronic device is in a charging state in the first running mode, and suspend determining the first performance mode-based compass information when the electronic device is in the charging state.

10. An electronic device, comprising:

a plurality of sensors;

a display; and memory storing instructions; and at least one processor including processing circuitry, wherein the instructions, when executed by the at least one processor individually or collectively, cause the electronic device to:

display, on the display, a display screen comprising a digital compass in a permanent running mode in which compass information is permanently provided, determine first performance mode-based compass information of the digital compass using the plurality of sensors, and provide the first performance mode-based compass information to a user through the digital compass, change a performance mode of the digital compass from a first performance mode to a second performance mode in response to an input to the digital compass on the display screen, determine second performance mode-based compass information using the plurality of sensors, and display, on the display, a compass face comprising the second performance mode-based compass information, wherein a sampling rate of a first sensor of the plurality of sensors is a first sampling rate in the first performance mode and the sampling rate of the first sensor is a second sampling rate greater than the first sampling rate in the second performance mode.

11. The electronic device of claim 10, wherein the instructions, when executed by the at least one processor individually or collectively, cause the electronic device to:

set the sampling rate of each of the plurality of sensors to be the first sampling rate in the first performance mode, and set the sampling rate of each of the plurality of sensors to be the second sampling rate in the second performance mode.

12. The electronic device of claim 10, wherein the instructions, when executed by the at least one processor individually or collectively, cause the electronic device to:

when there is no movement of the electronic device in the permanent running mode, change the performance mode of the digital compass from the first performance mode to a third performance mode, and inactive at least one selected from the plurality of sensors and determine third performance mode-based compass information using an activated sensor among the plurality of sensors.

13. The electronic device of claim 10, wherein the instructions, when executed by the at least one processor individually or collectively, cause the electronic device to:

determine whether the electronic device is in a charging state in the permanent running mode, and suspend determining the first performance mode-based compass information when the electronic device is in the charging state.

14. An electronic device, comprising:

a plurality of sensors;

a display; and a processor electrically connected to the plurality of sensors and the display, wherein the instructions, when executed by the at least one processor individually or collectively, cause the electronic device to:

determine first performance mode-based compass information of a digital compass using the plurality of sensors in a permanent running mode in which compass information is permanently provided, and display the determined first performance mode-based compass information on the display, determine whether a first motion of a user occurs, determines whether the user gazes at the display when it is determined that the first motion occurs, change a performance mode of the digital compass from a first performance mode to a second performance mode when it is determined that the user gazes at the display, determine second performance mode-based compass information using the plurality of sensors, and display the determined second performance mode-based compass information on the display, wherein a sampling rate of a first sensor of the plurality of sensors is a first sampling rate in the first performance mode and the sampling rate of the first sensor is a second sampling rate greater than the first sampling rate in the second performance mode.

15. The electronic device of claim 14, wherein the instructions, when executed by the at least one processor individually or collectively, cause the electronic device to:

set the sampling rate of each of the plurality of sensors to be the first sampling rate in the first performance mode, and set the sampling rate of each of the plurality of sensors to be the second sampling rate in the second performance mode.

16. The electronic device of claim 14, wherein the instructions, when executed by the at least one processor individually or collectively, cause the electronic device to:
determine whether a second motion of the user occurs when it is determined that the first motion does not occur, and
suspend determining the first performance mode-based compass information and inactivate at least one selected from the plurality of sensors when it is determined that the second motion occurs.

17. The electronic device of claim 14, wherein the instructions, when executed by the at least one processor individually or collectively, cause the electronic device to:
calculate an acceleration magnitude using an acceleration value measured in a first axial direction, an acceleration value measured in a second axial direction, and an acceleration value measured in a third axial direction, and
determine whether the user gazes at the display using the calculated acceleration magnitude and the acceleration value in the first axial direction.

18. A method of operating an electronic device, the method comprising:
when the electronic device is set to be in a first running mode, setting a performance mode of a digital compass to be a first performance mode, wherein the electronic device is in the first running mode for permanently providing compass information or in a second running mode for providing the compass information, in response to a request from a user;
determining first performance mode-based compass information using a plurality of sensors of the electronic device;
displaying the determined first performance mode-based compass information on a display of the electronic device;
when the electronic device is set to be in the second running mode, setting the performance mode of the digital compass to be a second performance mode;
determining second performance mode-based compass information using the plurality of sensors at the request from the user; and
displaying the determined second performance mode-based compass information on the display,
wherein a sampling rate of a first sensor of the plurality of sensors is a first sampling rate in the first performance mode and the sampling rate of the first sensor is a second sampling rate greater than the first sampling rate in the second performance mode.

\* \* \* \* \*